(12) United States Patent
Suzuki

(10) Patent No.: US 11,336,788 B2
(45) Date of Patent: May 17, 2022

(54) INFORMATION PROCESSING APPARATUS AND NON-TRANSITORY COMPUTER READABLE MEDIUM FOR COMBINING WRITTEN INFORMATION WITH IMAGE OF DOCUMENT

(71) Applicant: FUJIFILM Business Innovation Corp., Tokyo (JP)

(72) Inventor: Tatsuya Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/986,237

(22) Filed: Aug. 5, 2020

(65) Prior Publication Data
US 2021/0281697 A1    Sep. 9, 2021

(30) Foreign Application Priority Data

Mar. 4, 2020   (JP) .............................. JP2020-036465

(51) Int. Cl.
*H04N 1/387*   (2006.01)
*H04N 1/00*    (2006.01)
*G06V 30/414*  (2022.01)

(52) U.S. Cl.
CPC ....... *H04N 1/00816* (2013.01); *G06V 30/414* (2022.01)

(58) Field of Classification Search
None
See application file for complete search history.

(56) References Cited

U.S. PATENT DOCUMENTS

| | | | |
|---|---|---|---|
| 5,597,311 A * | 1/1997 | Yanagida | G09B 3/04 |
| | | | 382/317 |
| 6,023,342 A | 2/2000 | Yanagida | |
| 2003/0086116 A1* | 5/2003 | Hall | H04N 1/00236 |
| | | | 358/1.15 |
| 2009/0202971 A1* | 8/2009 | Cortez | G06Q 50/20 |
| | | | 434/350 |
| 2017/0064112 A1* | 3/2017 | Kobayashi | H04N 1/00366 |
| 2018/0061263 A1* | 3/2018 | Nishihara | G06F 40/174 |
| 2019/0147286 A1* | 5/2019 | Marks | G06K 7/1404 |
| | | | 382/321 |

FOREIGN PATENT DOCUMENTS

| JP | H06274092 | 9/1994 |
|---|---|---|
| JP | H07295958 | 11/1995 |
| JP | 3456749 | 10/2003 |

* cited by examiner

*Primary Examiner* — Dung D Tran
(74) *Attorney, Agent, or Firm* — JCIPRNET

(57) ABSTRACT

An information processing apparatus includes a processor. The processor is configured to receive an image of a document; extract first information and second information from information image printed on the document, the first information being related to writing on the document by a user, the second information indicating a position and a size of an area into which the first information is to be combined with the image of the document; and perform control to ensure the area indicated by the second information so that the area does not overlap a printed portion in the document and to combine the first information into the area.

11 Claims, 18 Drawing Sheets

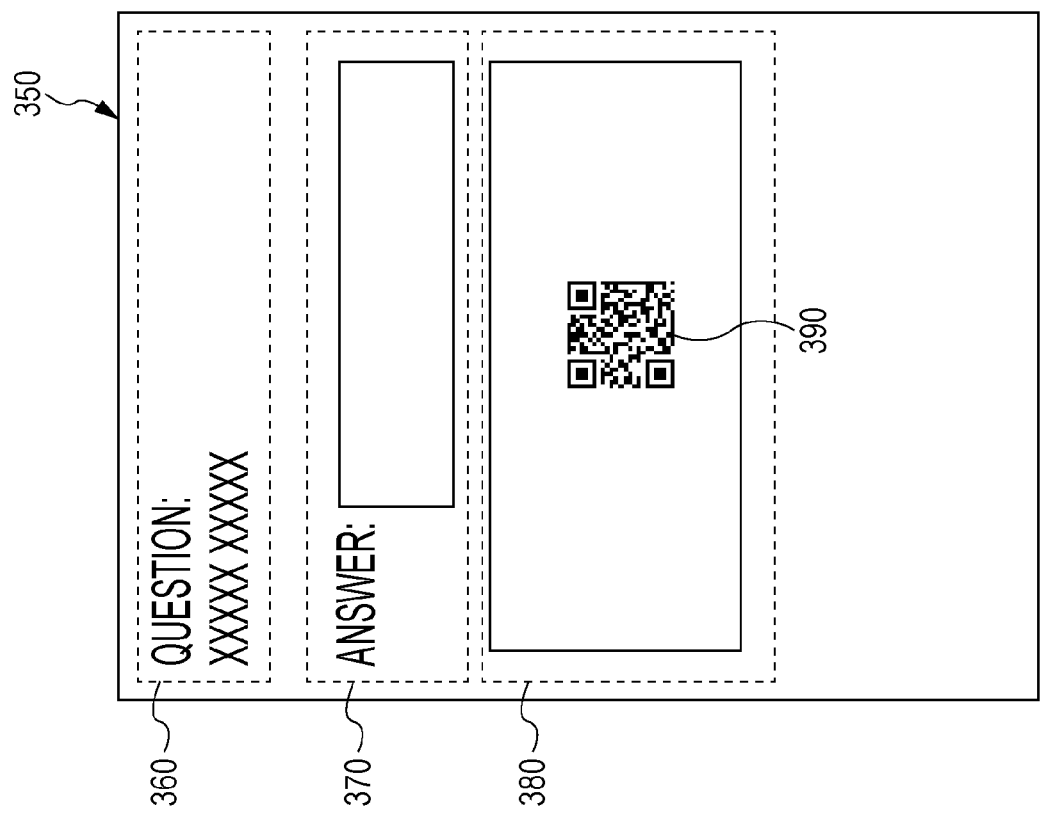
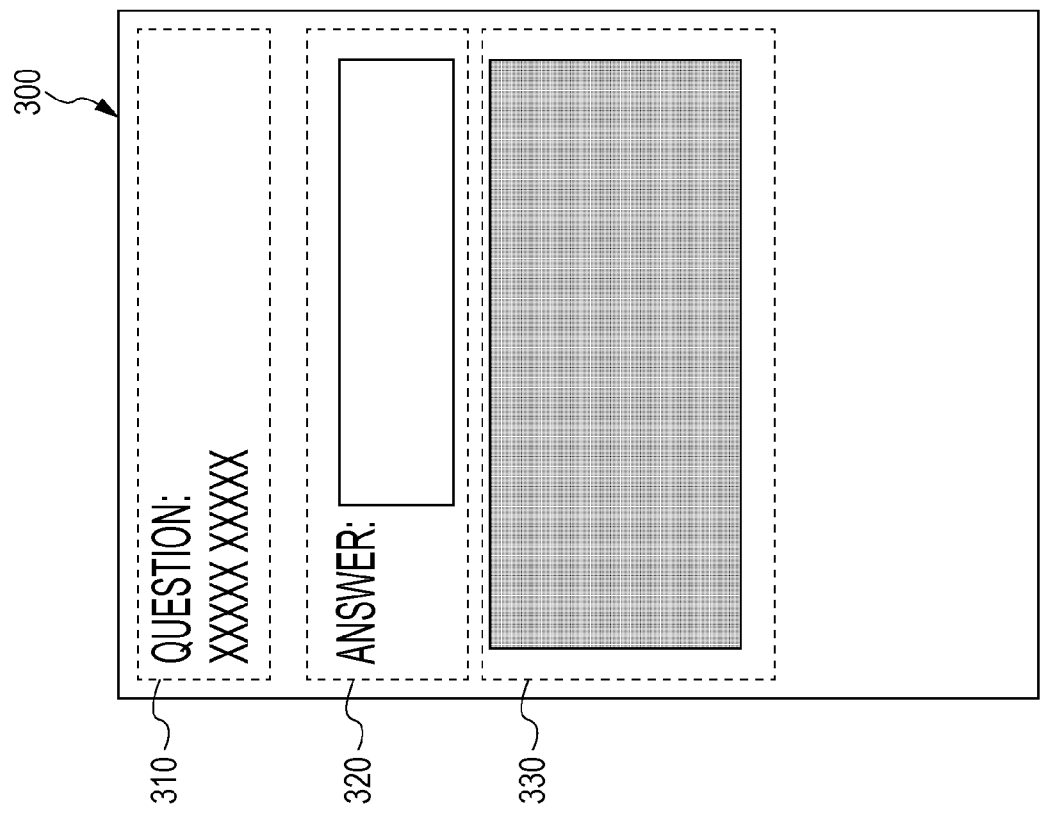

FIG. 10

| ITEM | REQUIRED/OPTIONAL | CONTENT | EXAMPLE |
|---|---|---|---|
| 1010 CORRECT ANSWER INFORMATION | OPTIONAL | CORRECT ANSWER TO QUESTION | |
| 1020 ALLOCATION OF POINTS | OPTIONAL | POINTS PER CORRECT ANSWER | 20 |
| 1030 ANSWER COLUMN | OPTIONAL | ORIGIN (X COORDINATE, Y COORDINATE) AND SIZE (HORIZONTAL DIMENSION, VERTICAL DIMENSION) OF ANSWER COLUMN (RECTANGULAR) | (20, 50, 200, 40) |
| 1040 DATA TYPE | REQUIRED | SPECIFY TYPE OF DATA. IF NO DATA TYPE IS SPECIFIED, TWO-DIMENSIONAL BARCODE IS PRINTED DIRECTLY | SPECIFY ANY OF THE FOLLOWING DATA TYPES [char] [image] [csv] [MIME] |
| 1050 COMBINING RANGE | OPTIONAL | ORIGIN (X COORDINATE, Y COORDINATE) AND SIZE (HORIZONTAL DIMENSION, VERTICAL DIMENSION) OF COMBINING RANGE (RECTANGULAR) IN WHICH DATA TYPE AND ANALYSIS RESULT OF DATA ARE REFLECTED. IF NO COMBINING RANGE IS SPECIFIED, FRAME AROUND TWO-DIMENSIONAL BARCODE IS RECOGNIZED AND SPACE IN RECOGNIZED FRAME IS IDENTIFIED AS PRINT RANGE. | (100, 250, 400, 200) |
| 1060 DATA | REQUIRED | SPECIFY FORMAT ACCORDING TO SPECIFIED DATA TYPE. | SEE "DATA TYPE/DATA RELATIONSHIP" |

FIG. 11

| DATA TYPE | DATA HANDLING | EXAMPLE DESCRIPTION |
|---|---|---|
| NOT SPECIFIED | DIRECTLY COMBINE IMAGE OF TWO-DIMENSIONAL BARCODE | |
| [char] | SPECIFY TEXT. COMBINE TEXT WITH FONT SIZE ADJUSTED TO FIT IN COMBINING RANGE. | [char]<br>George Washington |
| [image] | SPECIFY URL FOR DATA. OBTAIN IMAGE FILE FROM URL SPECIFIED FOR DATA, AND COMBINE IMAGE WITH IMAGE SIZE ADJUSTED TO FIT IN COMBINING RANGE. (SAME HANDLING AS FOR "NOT SPECIFIED" IS APPLIED TO ENVIRONMENTS WHERE THE INTERNET IS INACCESSIBLE) | [image]<br>http://www.xxx.xx/images/georgewashington.jpg |
| [csv] | ENTER DATA IN CSV FORMAT. CONVERT DATA INTO TABLE, AND COMBINE TABLE WITH FONT SIZE ADJUSTED TO FIT IN COMBINING RANGE. | [csv]<br>RANK, COUNTRY, PRODUCTION QUANTITY (IN t)<br>1, US, 37100000<br>2, EU, 23400000<br>3, CHINA, 22500000 |
| [MIME] | SET DATA AS MIME-ENCODED CHARACTER STRING | [MIME]<br>=?ISO-2022-JP?B?W2NoYXJdGyRCQDtGQUJAO1IbKEI=?= |

1100

1110 — NOT SPECIFIED
1120 — [char]
1130 — [image]
1140 — [csv]
1150 — [MIME]

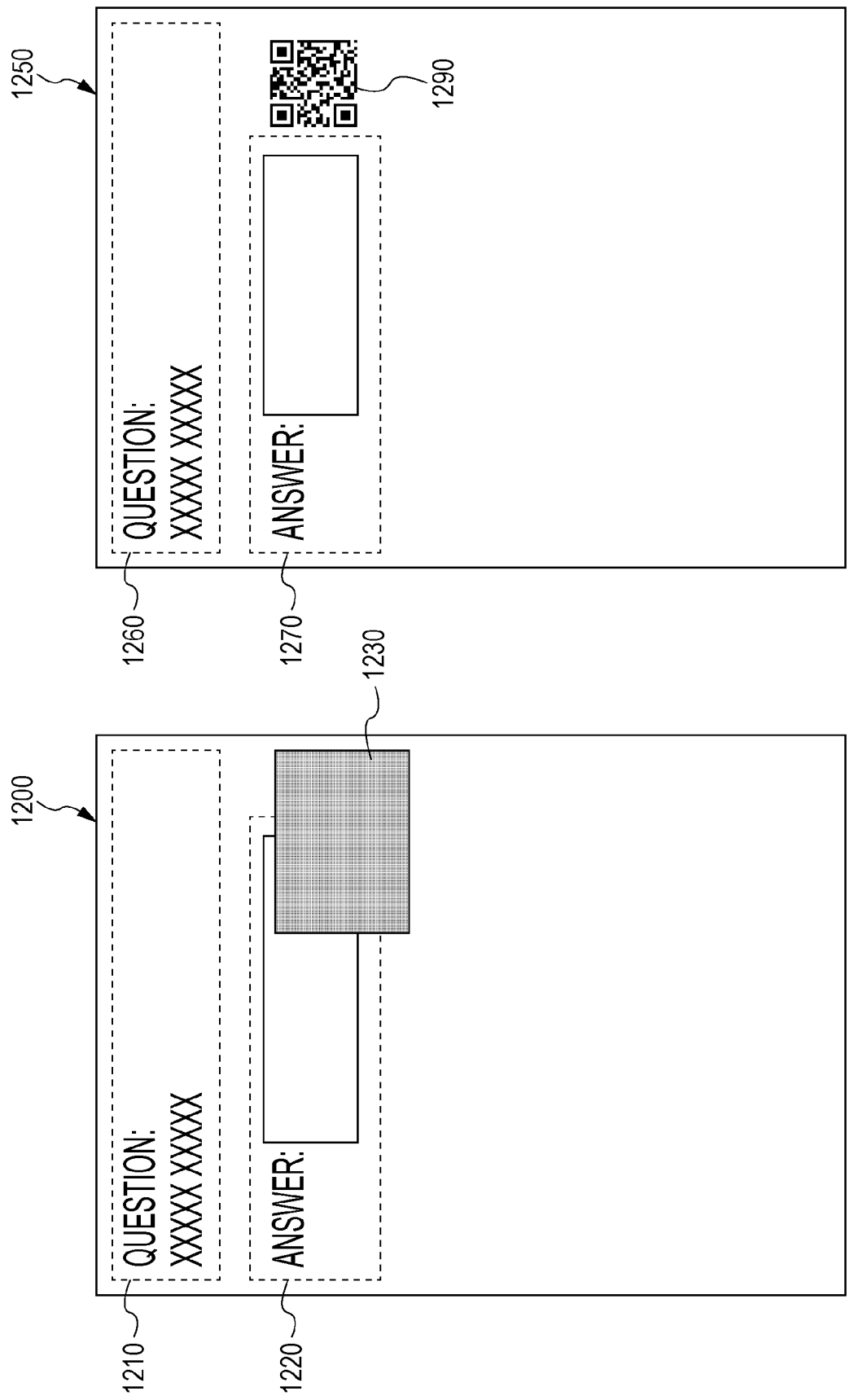

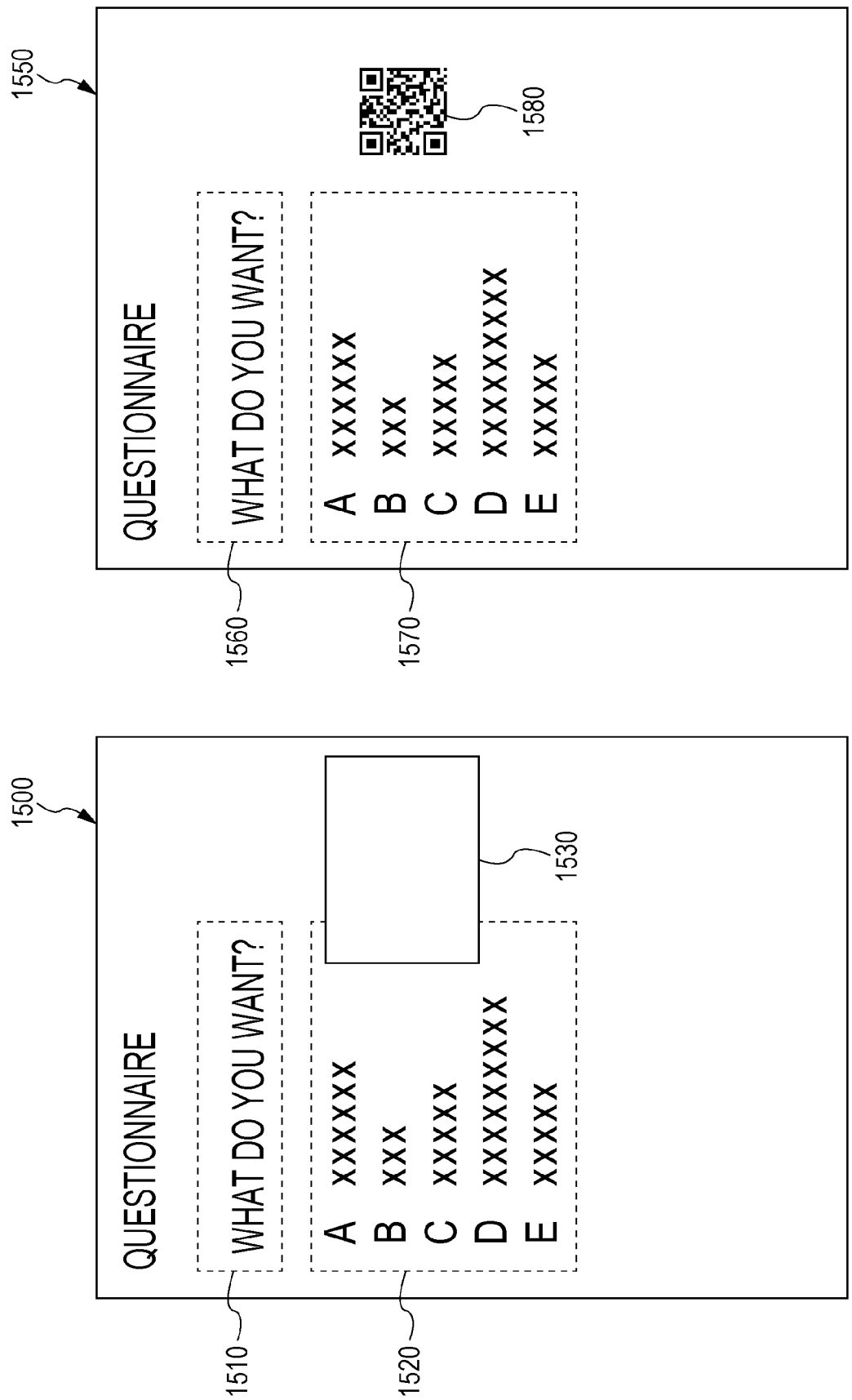

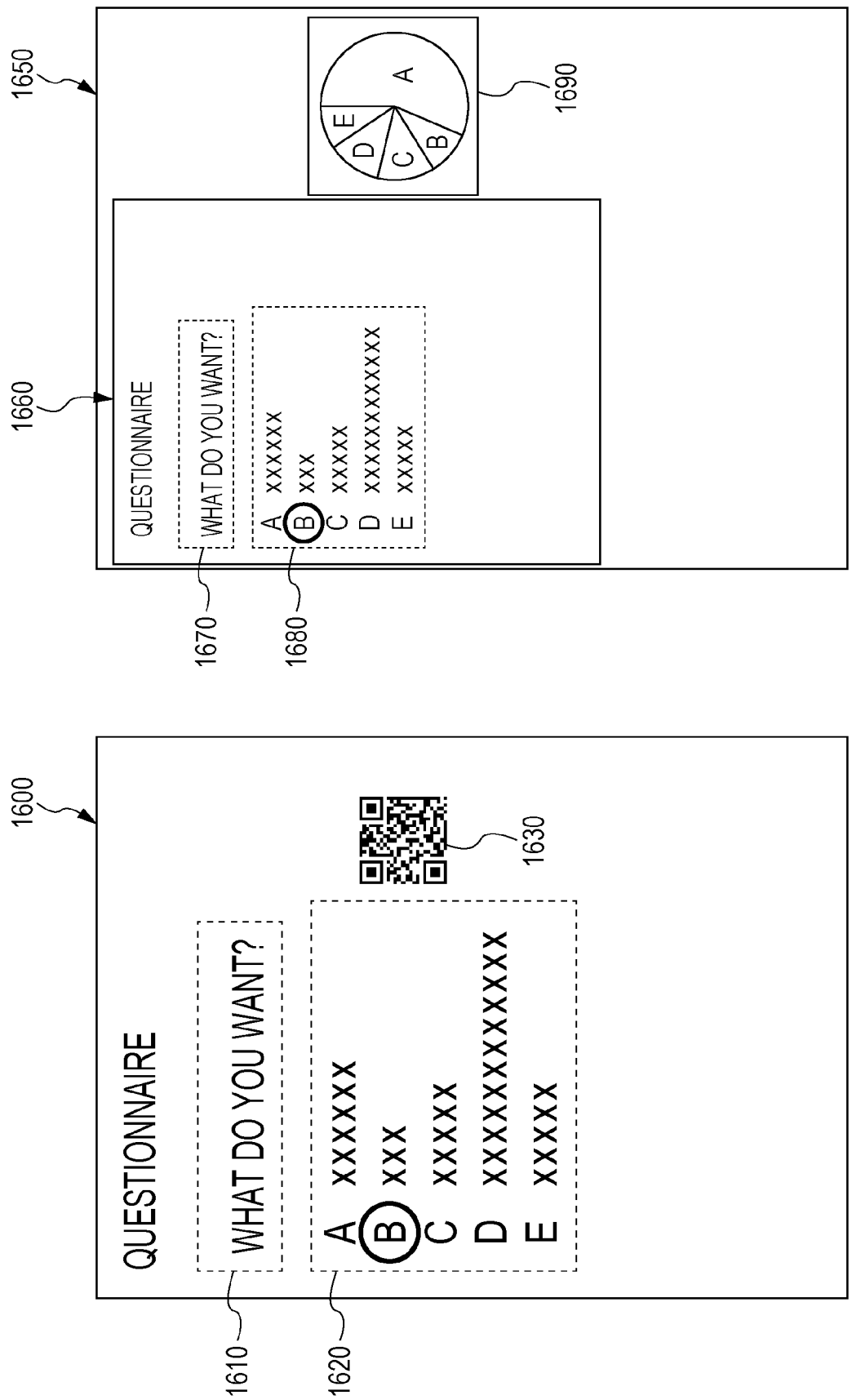

INFORMATION PROCESSING APPARATUS AND NON-TRANSITORY COMPUTER READABLE MEDIUM FOR COMBINING WRITTEN INFORMATION WITH IMAGE OF DOCUMENT

CROSS-REFERENCE TO RELATED APPLICATIONS

This application is based on and claims priority under 35 USC 119 from Japanese Patent Application No. 2020-036465 filed Mar. 4, 2020.

BACKGROUND

(i) Technical Field

The present disclosure relates to an information processing apparatus and a non-transitory computer readable medium.

(ii) Related Art

Japanese Unexamined Patent Application Publication No. 07-295958 discloses a paper media system capable of recording a barcode pattern, which is generated by converting specific information into code information, on a recording medium such as paper. In the paper media system, questions and sample answers are read by a scanner to form code information, and a portion to be specified in the code information is converted into a barcode by a barcode conversion unit. The information converted into a barcode is superimposed on an answer data portion by using a combining unit to form an answer sheet format, which is output by using a printer or the like to record a barcode pattern corresponding to specific information on examination paper.

Japanese Patent No. 3456749 discloses an image processing apparatus including image reading means for reading an image of a document placed in a predetermined image reading portion, image storage means for storing image information obtained by the image reading means, and image output means for forming the image information stored in the image storage means on a sheet placed in a predetermined image output portion as an image and outputting the image. The image processing apparatus further includes document conveying means for conveying the document placed in the image reading portion to the image output portion, and document processing means for outputting, based on the image information of the document read by the image reading means, image information required to form the image on the document placed in the image output portion. The document processing means includes answer recognition means for recognizing characters, symbols, or marks of answers to questions on the document from the image information of the document read by the image reading means, correct answer recognition means for identifying and recognizing at least coded correct answer information such as barcodes indicating correct answers to the questions on the document from the image information, scoring means for comparing the answers recognized by the answer recognition means with the correct answers recognized by the correct answer recognition means on a question-by-question basis to determine whether each of the answers is correct and for calculating scores for the answers on the basis of the determination results, and scoring result output means for outputting a scoring result obtained by the scoring means.

Japanese Unexamined Patent Application Publication No. 06-274092 discloses an electronic learning device capable of automatically scoring questions that are individually provided to students. The provided questions are in multiple-choice format, and questions, answer options from which to choose in answer columns, and barcodes generated by coding question numbers and selection answer numbers are printed. At the time of scoring, a barcode of an answer option selected as an answer in an answer sheet is read by a reader, and a question number and a selection answer number are determined from the read barcode. Then, a correct answer number is read from a correct-answer data area, and the correct answer number and the answer number in the answer column are compared to determine whether the answer number in the answer column is correct.

SUMMARY

When a document filled in with writing by a user is accepted and information related to the writing made by the user is to be combined with an image of the document, the information may overlap a pre-printed portion in the document.

Aspects of non-limiting embodiments of the present disclosure relate to an information processing apparatus and a non-transitory computer readable medium that accept a document filled in with writing by a user and combine information related to the writing made by the user with an image of the document such that the information related to the writing made by the user does not overlap a pre-printed portion in the document.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor. The processor is configured to receive an image of a document; extract first information and second information from information image printed on the document, the first information being related to writing on the document by a user, the second information indicating a position and a size of an area into which the first information is to be combined with the image of the document; and perform control to ensure the area indicated by the second information so that the area does not overlap a printed portion in the document and to combine the first information into the area.

BRIEF DESCRIPTION OF THE DRAWINGS

An exemplary embodiment of the present disclosure will be described in detail based on the following figures, wherein:

FIGS. 3A and 3B illustrate examples of how processing is carried out according to the exemplary embodiment;

FIG. 10 illustrates an example data structure of a two-dimensional barcode;

FIG. 11 illustrates an example data type/data relationship;

FIGS. 12A and 12B illustrate examples of how processing is carried out according to the exemplary embodiment;

FIGS. 15A and 15B illustrate examples of how processing is carried out according to the exemplary embodiment;

FIGS. 16A and 16B illustrate examples of how processing is carried out according to the exemplary embodiment;

DETAILED DESCRIPTION

The following describes an exemplary embodiment of the present disclosure with reference to the drawings.

Figure 1:
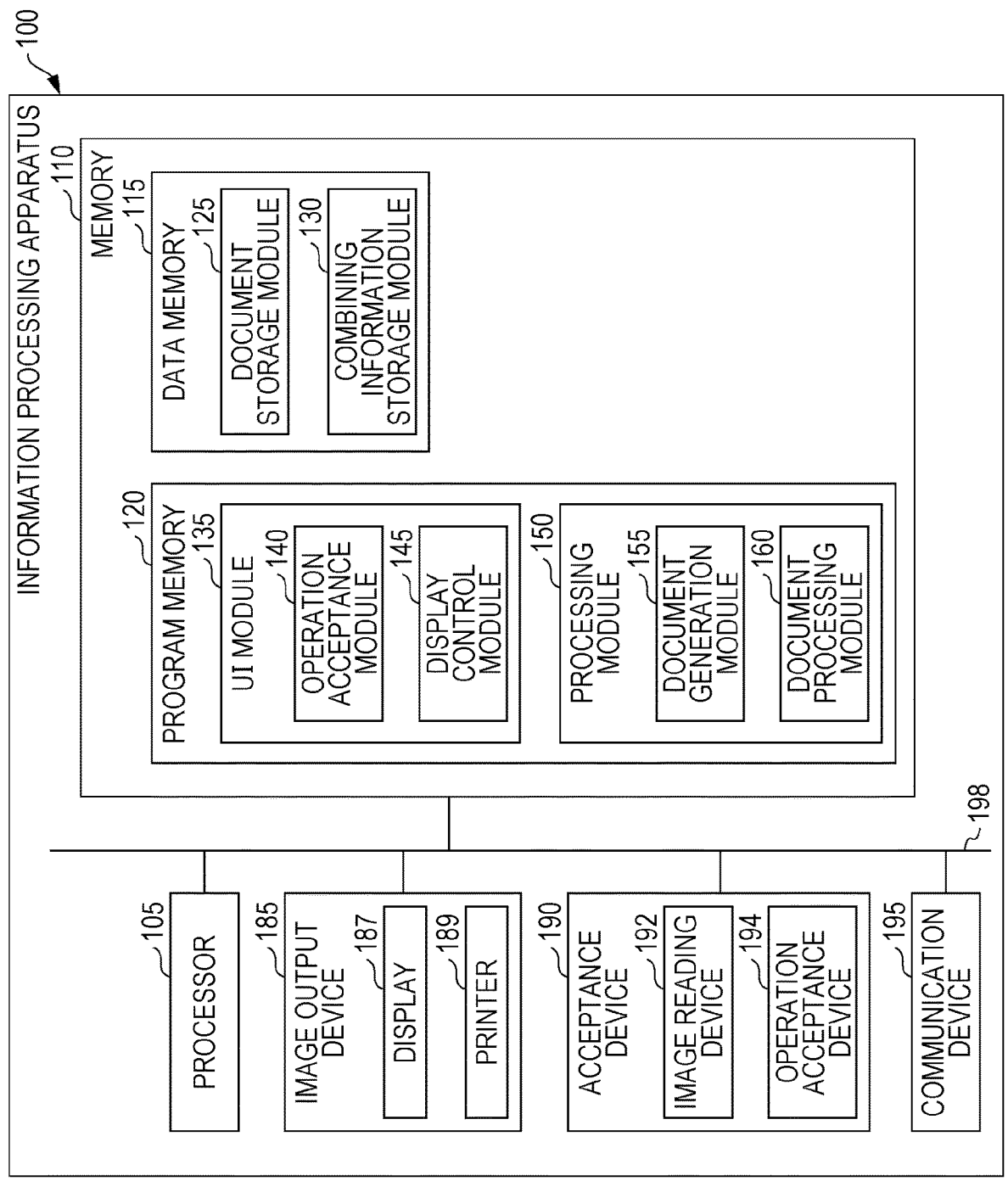
FIG. 1 is a conceptual module configuration diagram illustrating an example configuration of an information processing apparatus according to an exemplary embodiment.

FIG. 1 is a conceptual module configuration diagram illustrating an example configuration of an information processing apparatus according to this exemplary embodiment.

The term "module" generally refers to a logically separable component such as a software (a computer program is included as an interpretation of "software") or hardware component. Thus, each module in this exemplary embodiment refers not only to a module in a computer program but also to a module in a hardware configuration. Accordingly, this exemplary embodiment is also directed to a computer program for causing a computer to function as these modules (e.g., a program for causing the computer to execute the respective procedures, a program for causing the computer to function as the respective means, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or a plurality of modules may be constituted by a single program in actual implementation. Conversely, a single module may be constituted by a plurality of programs. In addition, a plurality of modules may be executed by a single computer, or a single module may be executed by a plurality of computers in a distributed or parallel environment. As an alternative, a single module may include another module. In the following, the term "connection" refers not only to a physical connection but also to a logical connection (such as exchanging of data, sending instructions, a reference relationship between data, and login). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there is a plurality of "predetermined values", the values may be different or two or more (or all) of the values may be identical. A description having a meaning of "if A, then B" is used to mean: "it is determined whether or not A, and B if it is determined that A" unless the determination of whether or not A is required. Further, when elements are enumerated, such as "A, B, and C", the enumerated elements are examples unless otherwise stated, and the enumeration is used to also include selection of only one of them (e.g., only A).

Furthermore, the term "system", "apparatus", or "device" is used to include a configuration in which a plurality of computers, hardware components, apparatuses, devices, or other suitable elements are connected to each other via a communication means such as a network (including one-to-one communication connections), and what is implemented by a single computer, hardware component, apparatus, device, or suitable element. The terms "apparatus", "device", and "system" are used synonymously. It is to be understood that the term "system" does not include what is merely a social "mechanism" (i.e., a social system), which is a kind of artificial arrangement.

Moreover, target information is read from a storage device for each processing operation that is to be performed by an individual module or, if a plurality of processing operations are to be performed within a module, for each of the plurality of processing operations. After the processing is performed, the result of the processing is written to the storage device. Thus, the reading of information from the storage device before the processing of the information is to be performed and the writing of information to the storage device after the processing of the information has been performed will not be described in some cases.

An information processing apparatus 100 according to this exemplary embodiment has a function of performing processing on a document filled in with writing by a user to combine information related to the writing made by the user with an image of the document. As illustrated in an example in FIG. 1, the information processing apparatus 100 at least includes a processor 105 and a memory 110, and the processor 105 and the memory 110 are connected to each other via a bus 198 to exchange data. The information processing apparatus 100 may further include an image output device 185, an acceptance device 190, and a communication device 195. The processor 105, the memory 110, the image output device 185, the acceptance device 190, and the communication device 195 exchange data via the bus 198.

The block diagram in the example illustrated in FIG. 1 also illustrates an example hardware configuration of a computer that implements this exemplary embodiment. A computer that executes a program according to this exemplary embodiment has a hardware configuration exemplified in FIG. 1. Specifically, the computer is a personal computer, a computer serving as a server, or the like. In a specific example, the computer includes the processor 105 serving as a processing unit, and the memory 110 serving as a storage device.

The information processing apparatus 100 may include a single processor 105 or a plurality of processors 105. Examples of the processor 105 include a central processing unit (CPU) and a microprocessor. A plurality of processors 105 may be either tightly coupled multiprocessors or loosely coupled multiprocessors. For example, a single processor 105 may have a plurality of processor cores. Alternatively, a system may be used in which a plurality of computers are coupled to each other via a communication path to behave as a single virtual computer. In a specific example, the processor 105 may be configured as a cluster system or a computer cluster, which is a loosely coupled multiprocessor. The processor 105 executes a program stored in a program memory 120.

The memory 110 may include, for example, a semiconductor memory contained in the processor 105, such as a register or a cache memory, a main memory implemented as a random access memory (RAM) or a read only memory (ROM), an internal storage device having a persistent storage function, such as a hard disk drive (HDD) or a solid state drive (SSD), an external storage device or an auxiliary storage device such as a compact disc (CD), a digital versatile disc (DVD), a Blu-ray (registered trademark) Disc, a Universal Serial Bus (USB) memory, or a memory card, or a storage device of a server or the like connected via a communication line.

The memory 110 includes the program memory 120 and a data memory 115. The program memory 120 mainly stores programs, and the data memory 115 mainly stores data. The program memory 120 and the data memory 115 may store, in addition to the programs that are modules illustrated in FIG. 1, a program for starting the computer, such as an operating system (OS), and data such as parameters that change as appropriate in accordance with the execution of the modules.

The image output device 185 includes a display 187 and a printer 189, for example. The display 187, such as a liquid crystal display, an organic electroluminescent (EL) display, or a three-dimensional display, displays processing results obtained by the processor 105, the data stored in the data memory 115, and so on as text or image information or the like. The printer 189, such as a multifunction peripheral, prints processing results obtained by the processor 105, the data stored in the data memory 115, and so on. Other examples of the image output device 185 include a speaker and an actuator that vibrates devices.

The acceptance device 190 includes an image reading device 192 and an operation acceptance device 194, for example.

The image reading device 192 reads an image of a document. For example, the image reading device 192 accepts an image generated by the reading operation of a scanner, an image captured using a digital camera, an image transmitted via facsimile, an image received from a server or the like having an image database, and other images.

The operation acceptance device 194 accepts data based on the operation (including a motion, voice or speech, a line of sight, and so on) of a user using a keyboard, a mouse, a microphone, a camera (including a line-of-sight detection camera and the like).

A device having both functions of the display 187 and the acceptance device 190, such as a touch screen, may be included. In this case, the function of a keyboard may be implemented without using physical keys. Specifically, a keyboard (also referred to as a software keyboard, a screen keyboard, or the like) may be drawn on the touch screen by means of software to implement the function of a keyboard.

The display 187 and the operation acceptance device 194 are typically used as user interfaces (UIs).

The communication device 195 is a communication line interface such as a network card for connecting to another device via a communication line.

In this exemplary embodiment, a component based on a computer program is implemented by loading the computer program, which is software, into the program memory 120 having the hardware configuration described above and making software and hardware resources cooperate with each other. Accordingly, this exemplary embodiment is implemented.

The hardware configuration illustrated in FIG. 1 is one example configuration, and this exemplary embodiment is not limited to the configuration illustrated in FIG. 1 and may provide any configuration capable of executing the modules described in this exemplary embodiment. For example, the processor 105 may be implemented as a graphics processing unit (GPU) including general-purpose computing on graphics processing units (GPGPUs), or some modules may be implemented by dedicated hardware (for example, an application-specific integrated circuit (ASIC)) or a reconfigurable integrated circuit (specific examples of which include a field-programmable gate array (FPGA)), and other modules may be located in an external system and may be connected via a communication line. Alternatively, a plurality of systems, each of which is illustrated in FIG. 1, may be connected to each other via a communication line to operate in cooperation with each other. The processor 105 may be incorporated in, in particular, as well as a personal computer, any other device such as a mobile information communication device (including a mobile phone, a smartphone, a mobile device, and a wearable computer), an information home appliance, a robot, a copying machine, a facsimile machine, a scanner, a printer, or a multifunction peripheral (an image processing apparatus having two or more functions of devices among a scanner, a printer, a copying machine, a facsimile machine, and so on).

The processor 105 is connected to the memory 110, the image output device 185, the acceptance device 190, and the communication device 195 via the bus 198. The processor 105 executes a process according to a computer program describing an execution sequence for each module, which is a program, in the program memory 120. For example, in response to, as a trigger, the acceptance device 190 reading an image of a document or the operation acceptance device 194 accepting an operation of a user, the processor 105 executes a process using a module corresponding to the trigger in the program memory 120, and stores the processing results in the data memory 115, outputs the processing results on the display 187, or controls the communication device 195 to transmit the processing results to another device.

The memory 110 includes the data memory 115 and the program memory 120 and is connected to the processor 105, the image output device 185, the acceptance device 190, and the communication device 195 via the bus 198.

The data memory 115 includes a document storage module 125 and a combining information storage module 130.

The document storage module 125 stores an image of a target document in this exemplary embodiment. For example, the document storage module 125 stores an image read by the image reading device 192. The image of the document has printed thereon an information image, and the document has been filled in with writing by a user. In a specific example, the document may be an answer sheet, the user may be a person who fills in the answer sheet with writing, and the writing made by the user may be an answer to a question. In another specific example, the document may be a questionnaire, the user may be a person who fills in the questionnaire with writing or a person who responds to the questionnaire, and the writing made by the user may be a response to a questionnaire question. The information image is an image code that is systematically formed to represent electronic data in a machine-readable form, and specific examples of the information image include a one-dimensional barcode and a two-dimensional barcode. In particular, a QR code (registered trademark) (abbreviated from Quick Response code) has recently been available as a two-dimensional barcode. This exemplary embodiment exemplifies a two-dimensional barcode.

The combining information storage module 130 stores first information and second information. The first information is related to the writing made by the user. The second information indicates the position and size of an area into which the first information is to be combined with the image of the document.

In the example described above, when the document is an answer sheet, the first information may be a correct answer or an explanation of the correct answer, and the second information may indicate the position and size of an area where the explanation is to be provided.

When the document is a copy of a questionnaire, the first information may indicate a storage location of a tabulation result of responses to the questionnaire, and the second information may indicate the position and size of an area where the tabulation result is to be provided. Examples of the "storage location of a tabulation result" include a uniform resource locator (URL). The tabulation result of responses to the questionnaire may take into account responses that have been collected from different respondents up to the current time point (i.e., a real-time collection of responses) or may take into account responses that have been collected up to a predetermined time point. The tabulation result of responses to the questionnaire may take into account responses to one or more questions asked by the questionnaire.

The program memory 120 stores a UI module 135 and a processing module 150. The program memory 120 stores modules that are programs to be executed by the processor 105. The processor 105 performs processes in accordance with these programs.

The UI module 135 includes an operation acceptance module 140 and a display control module 145. The UI module 135 performs processing related to a user interface.

The operation acceptance module 140 performs processing related to an operation accepted by the operation acceptance device 194. Specifically, the operation acceptance module 140 causes a module corresponding to the operation in the processing module 150 to perform processing.

The display control module 145 controls the display 187 to perform display in accordance with a processing result obtained by a module in the processing module 150.

The processing module 150 includes a document generation module 155 and a document processing module 160. The processing module 150 performs processing related to a document according to this exemplary embodiment.

The document generation module 155 performs a process of generating an information image, combining the information image with an image of the document, and printing the image by using the printer 189. That is, the document generation module 155 performs processing to print a document that is yet to be filled in by the user. In the example described above, the document is a blank answer sheet or a blank questionnaire, which has not been filled in by a user. The processing performed by the document generation module 155 will be described in detail below with reference to an example illustrated in FIG. 5, FIG. 6, and so on.

The document processing module 160 performs processing to cause the image reading device 192 to read a filled-in document, which is obtained as a result of the user filling in the document printed by the document generation module 155, and to combine information with the read document in accordance with information embedded in the information image. The document processing module 160 further performs processing to cause the printer 189 to print an image of the document with which the information has been combined.

The document processing module 160 accepts an image of a document filled in with writing by a user and having an information image printed thereon. Further, the document processing module 160 extracts first information and second information from the information image. The first information is related to the writing made by the user, and the second information indicates the position and size of an area into which the first information is to be combined with the image of the document. Then, the document processing module 160 performs control to ensure the area indicated by the second information so that the area does not overlap a printed portion in the document and to combine the first information into the area.

The "printed portion in the document" is a portion corresponding to the content of the document printed by the document generation module 155. In an answer sheet in the example described above, examples of the "printed portion in the document" include areas where questions are provided, and areas where answers are to be entered. In a questionnaire, examples of the "printed portion in the document" include areas where questions are provided, and areas where responses are to be entered. The printed portion may not include the information image. This is because the information image is no longer necessary after the user has filled in the document. If information is to be combined with the information image, the information is overlaid on the information image. That is, the information image is removed from the document.

The term "ensure" means that an area where the first information is to be provided and the printed portion in the document do not overlap. If the document has a space larger than or equal to the area into which the first information is to be combined, the space is ensured.

The "position of the area" indicated by the second information is a position of an area adjoining the area to be filled in with writing by the user and a position at which the first information is to be provided in accordance with the writing made by the user.

If the area indicated by the second information overlaps the printed portion in the document, the document processing module 160 may shift the printed portion to ensure the area.

The document processing module 160 may also shift the printed portion in the document to narrow a space along an edge of the document to ensure the area indicated by the second information. Examples of the "edge of the document" include the left, right, top, and bottom edges of the document.

For example, the document has a space of A mm along the left edge and a space of B mm along the right edge. In this case, the entire printed portion is shifted to the left by an amount corresponding to A mm to generate a space of A+B mm along the right edge. The first information may be combined into the space generated along the right edge. It is to be understood that the entire printed portion may be shifted to the right by an amount corresponding to B mm to generate a space of A+B mm along the left edge and that the first information may be combined into the space generated along the left edge.

For example, the document has a space of C mm along the top edge and a space of D mm along the bottom edge. In this case, the entire printed portion is shifted upward by an amount corresponding to C mm to generate a space of C+D mm along the bottom edge. The first information may be combined into the space generated along the bottom edge. It is to be understood that the entire printed portion may be shifted downward by an amount corresponding to D mm to generate a space of C+D mm along the top edge and that the first information may be combined into the space generated along the top edge.

If the area indicated by the second information overlaps the printed portion in the document even after the printed portion has been shifted, the document processing module 160 may reduce the size of the printed portion to ensure the area.

As described above, if it is difficult to ensure an area required to provide the first information even after the printed portion has been shifted to narrow a space along either edge to increase the size of the space along the opposite edge, the document processing module 160 reduces the size of the printed portion in the document. The reduction ratio of the size of the printed portion in the document may be high enough to ensure an area required to provide the first information. The reduction ratio may be a predetermined value or may be calculated from the size of the area required to provide the first information and the size of the printed portion.

In a specific example, when the document is an answer sheet, the document processing module 160 performs character recognition on an answer written by the user in the answer sheet and calculates a score for the character recognition result by using a correct answer. Then, the document processing module 160 combines an explanation of the correct answer with the image of the document in accordance with the second information.

Alternatively, the explanation of the correct answer may be combined with the image of the document in accordance with the second information if the answer written by the user is incorrect. The expression "if the answer written by the user is incorrect" may be interpreted as meaning that "only when the answer written by the user is incorrect". That is, if the answer written by the user is correct, the explanation of the correct answer may not be combined with the image of the document.

Conversely, if the answer written by the user is correct, the explanation of the correct answer may be combined with the image of the document in accordance with the second information. The expression "if the answer written by the user is correct" may be interpreted as meaning that "only when the answer written by the user is correct". That is, if the answer written by the user is incorrect, the explanation of the correct answer may not be combined with the image of the document.

The information to be embedded in a two-dimensional barcode may include flag information indicating that "an explanation of the correct answer is combined only when the answer written by the user is incorrect" or "an explanation of the correct answer is combined only when the answer written by the user is correct".

In another specific example, when the document is a questionnaire, the document processing module 160 obtains a tabulation result from the storage location. Then, the document processing module 160 combines the tabulation result with the image of the document in accordance with the second information.

The processing performed by the document processing module 160 will be described in detail below with reference to an example illustrated in FIG. 7, FIG. 8, and so on.

Figure 2A:
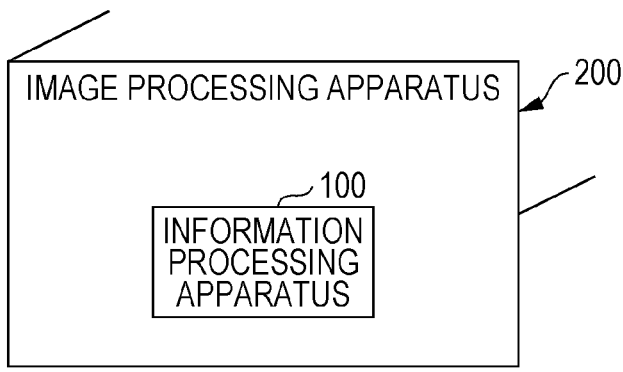
FIGS. 2A and 2B illustrate example configurations of systems according to the exemplary embodiment.
Figure 2B:
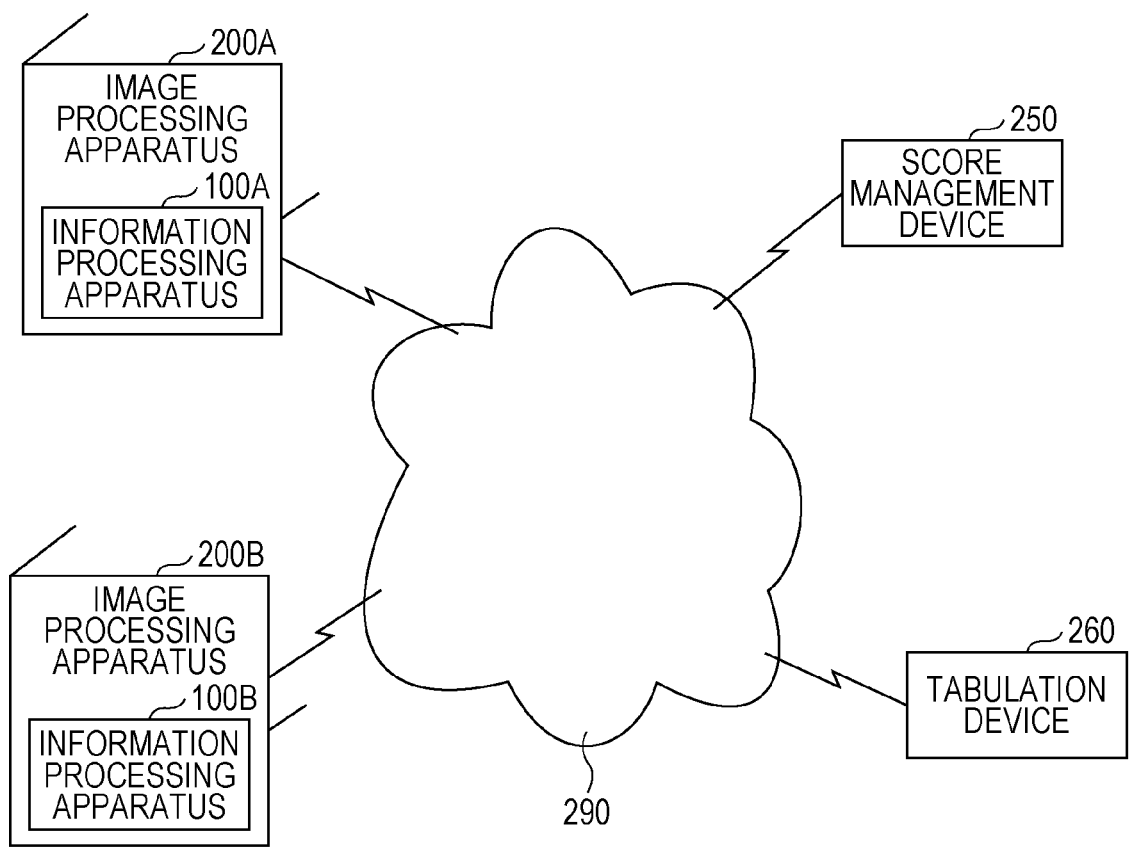

FIGS. 2A and 2B illustrate example configurations of systems according to this exemplary embodiment.

FIG. 2A illustrates an example of a stand-alone system constructed according to this exemplary embodiment. An image processing apparatus 200 has the functions of the information processing apparatus 100. Specifically, a document generated by the document generation module 155 is printed by using the printing function of the image processing apparatus 200, and the printed document is filled in with writing by a user. The filled-in document is read by using the scanner function of the image processing apparatus 200, information related to the writing made by the user is combined with the document, and the resulting document is printed by using the printing function of the image processing apparatus 200. The user, who views the printed document, is able to know the information related to the writing made by the user.

When the document is an answer sheet, the user is able to obtain a document including information about whether an answer written by the user is correct and also including an explanation of the correct answer.

When the document is a copy of a questionnaire, the user can provide his/her own responses and get a document including a tabulation result that also takes into account responses from others who have also been given a copy of the questionnaire. That is, after the user provides his/her response to the questionnaire, he/she is fed back with the latest tabulation result that has reflected his/her response.

FIG. 2B illustrates an example of a network system constructed according to this exemplary embodiment.

An image processing apparatus 200A, an image processing apparatus 200B, a score management device 250, and a tabulation device 260 are connected to one another via a communication line 290. The image processing apparatus 200A and the image processing apparatus 200B have the functions of the information processing apparatus 100 (i.e., an information processing apparatus 100A and an information processing apparatus 100B). The communication line 290 may be wireless, wired, or a combination thereof and may be, for example, a communication infrastructure such as the Internet or an intranet.

The score management device 250 may be configured to obtain scores from the image processing apparatuses 200A and 200B (hereinafter referred to as image processing apparatuses 200) and to distribute a result of processing information on the scores to each of the image processing apparatuses 200. For example, the ranking of scores may be returned to the image processing apparatuses 200 and may be presented in the image of the document. Alternatively, the URL of the score management device 250 may be included in the information image as first information to allow each of the image processing apparatuses 200 to access the URL to obtain the rank of the corresponding user and combine the rank into the image of the document.

The tabulation device 260 may be configured to obtain responses to the questionnaire from the image processing apparatuses 200 and to return a tabulation result of the responses to the questionnaire to the image processing apparatuses 200. Then, the image processing apparatuses 200 combine the tabulation result into the questionnaire.

The functions of the score management device 250 and the tabulation device 260 may be implemented as cloud services.

FIGS. 3A and 3B illustrate examples of how processing is carried out according to this exemplary embodiment. FIGS. 3A and 3B illustrate an example in which the target document is an answer sheet.

In the example illustrated in FIG. 3A, a draft of an examination answer sheet is illustrated. An answer sheet (for design) 300 has (1) a question column 310 that is an area providing a question, (2) an answer column 320 that is an area to be filled in with an answer to the question, and (3) an explanation column 330 that is an area where an explanation of the correct answer is to be provided.

In the example illustrated in FIG. 3B, a document generated in accordance with the answer sheet (for design) 300 illustrated in the example in FIG. 3A is illustrated. That is, an answer sheet 350 is a document obtained by printing a document generated by the document generation module 155 by using the printer 189. The answer sheet 350 has a question column 360, an answer column 370, and an explanation column 380. It is to be understood that the question column 360 corresponds to the question column 310, the answer column 370 corresponds to the answer column 320, and the explanation column 380 corresponds to the explanation column 330. The explanation column 380 contains a two-dimensional barcode 390. The process of generating the answer sheet 350 will be described below with reference to a flowchart illustrated in an example in FIG. 6.

Figure 4B:
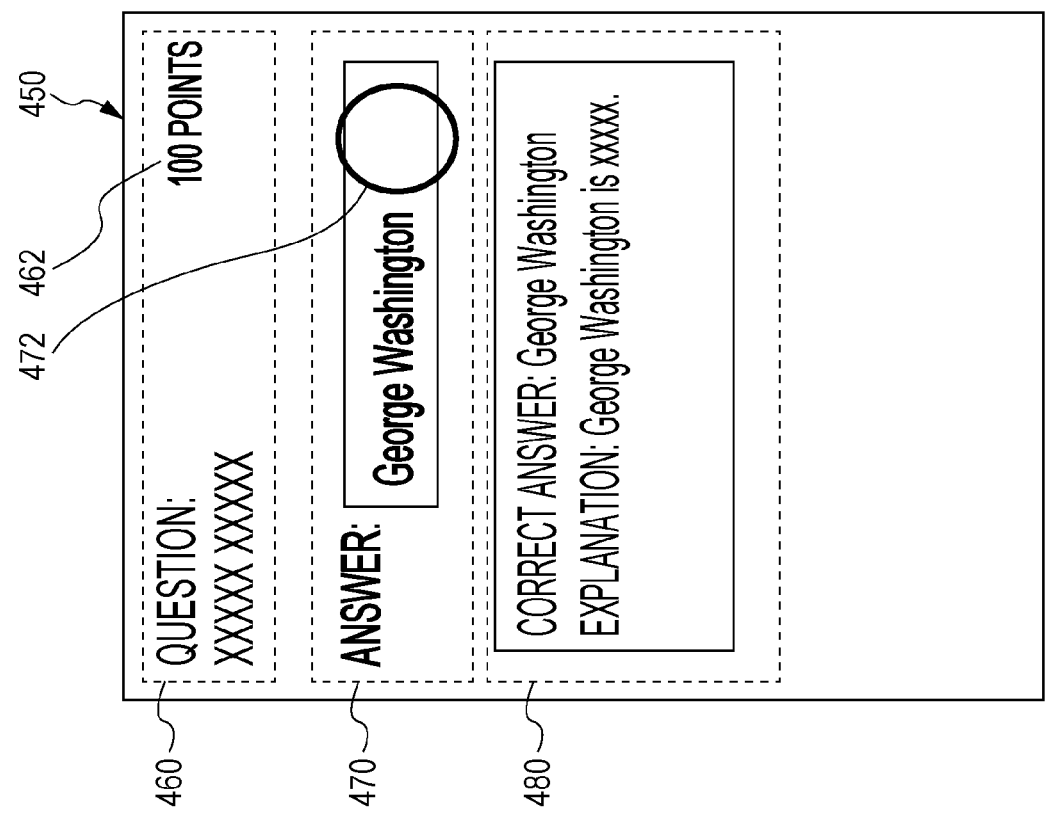
FIGS. 4A and 4B illustrate examples of how processing is carried out according to the exemplary embodiment.
Figure 4A:
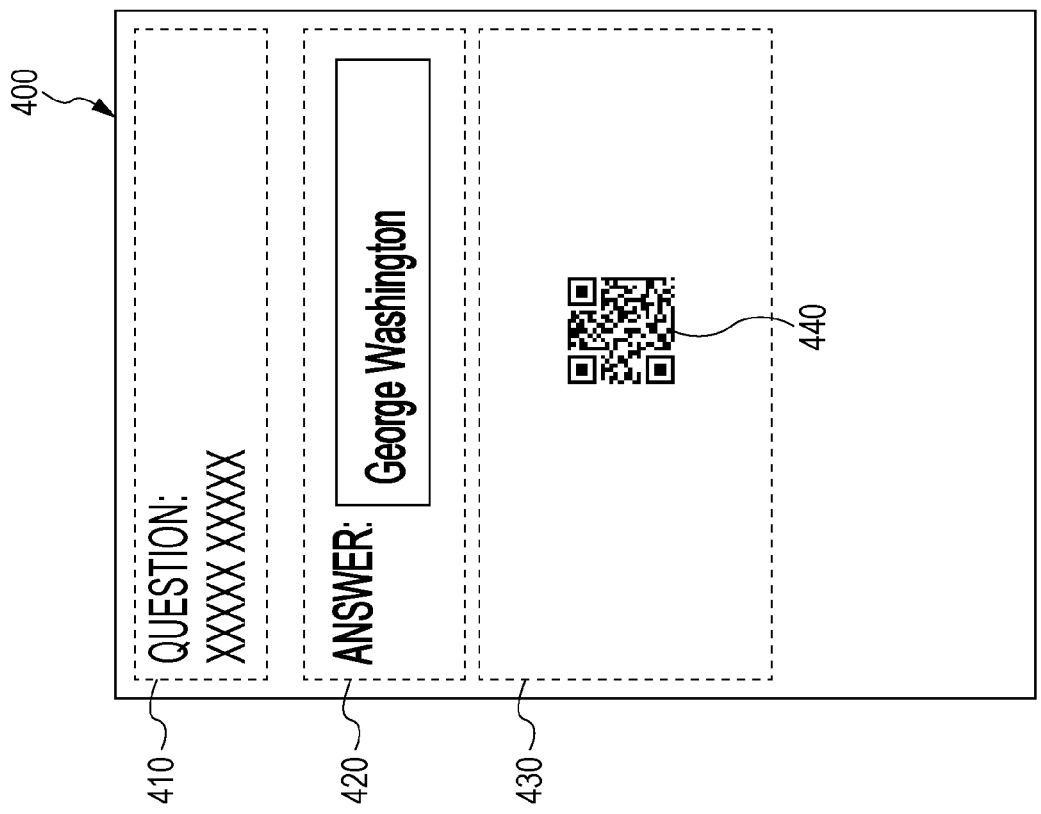

FIGS. 4A and 4B illustrate examples of how processing is carried out according to this exemplary embodiment.

In the example illustrated in FIG. 4A, a document including an answer entered by a user is illustrated. That is, an answer sheet 400 is a document obtained by filling in the answer sheet 350 with an answer. The answer sheet 400 has a question column 410, an answer column 420, and an explanation column 430. It is to be understood that the question column 410 corresponds to the question column 360, the answer column 420 corresponds to the answer column 370, and the explanation column 430 corresponds to the explanation column 380. The explanation column 430 contains a two-dimensional barcode 440. The answer column 420 is filled in with an answer by the user. In the illustrated example, "George Washington" is entered in the answer column 420.

In the example illustrated in FIG. 4B, a document containing a scoring result for the answer sheet 400 and also containing an explanation of the correct answer is illustrated. That is, an answer sheet 450 is a document obtained by reading the answer sheet 400 by using the image reading device 192 and printing processing results obtained by the document processing module 160 by using the printer 189. The answer sheet 450 has a question column 460, an answer column 470, and an explanation column 480. It is to be understood that the question column 460 corresponds to the question column 410, the answer column 470 corresponds to the answer column 420, and the explanation column 480 corresponds to the explanation column 430. The question column 460 contains a score 462 indicating "100 points" (perfect score). A scoring result 472 is given in the answer column 470. That is, the handwritten character string "George Washington" in the answer column 470 is subjected to character recognition, and the character recognition result and the correct answer embedded in the two-dimensional barcode 440, namely, "George Washington", are compared to determine that the handwritten answer is correct. Accordingly, the scoring result 472 indicating that the entered answer is correct is provided in the answer column 470. The explanation column 480 provides a description, for example, "Correct Answer: George Washington" and "Explanation: George Washington is xxxxx".

Figure 5:
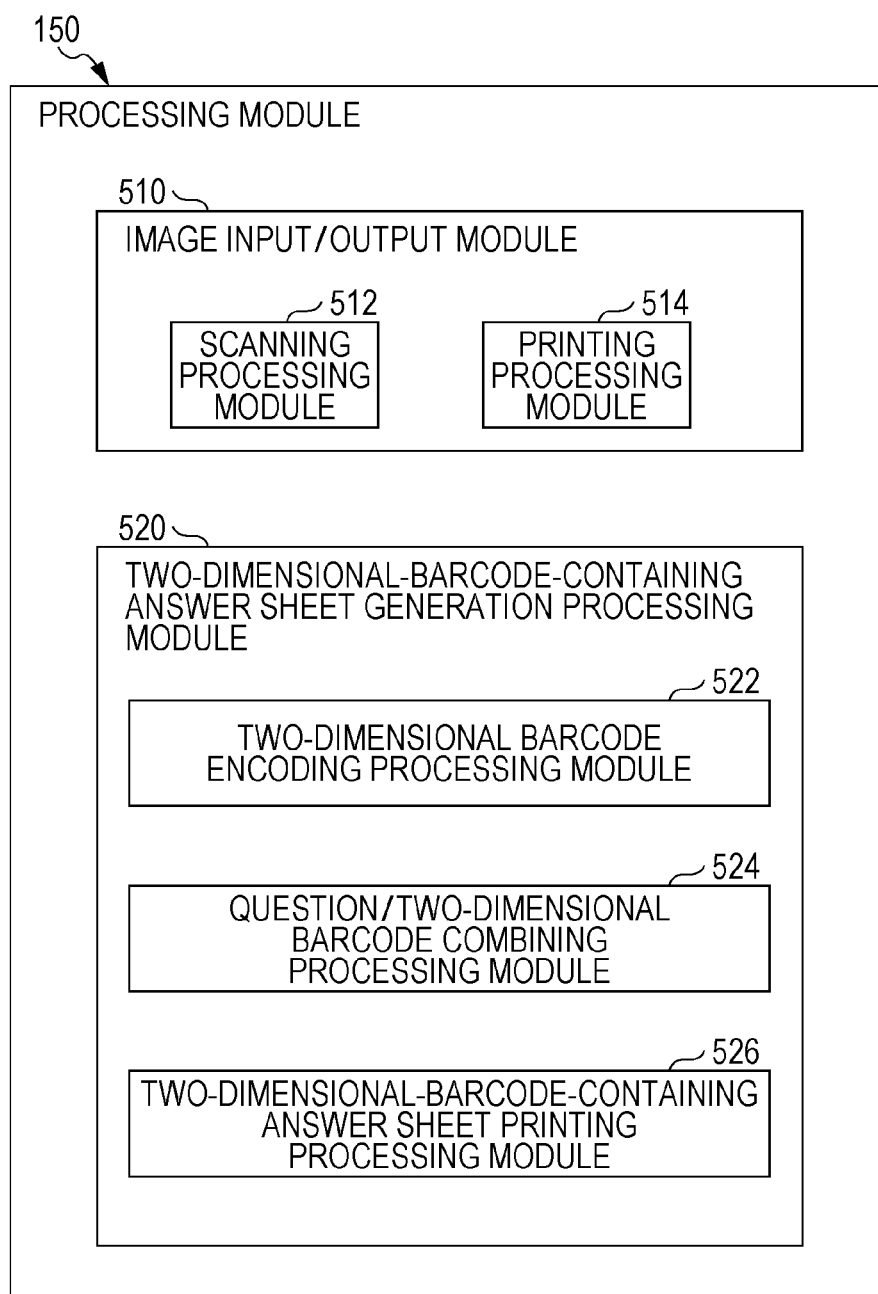
FIG. 5 is a specific module configuration diagram of a processing module according to the exemplary embodiment.

FIG. 5 is a specific module configuration diagram of the processing module 150 according to this exemplary embodiment.

The processing module 150 includes an image input/output module 510 and a two-dimensional-barcode-containing answer sheet generation processing module 520.

The image input/output module 510 includes a scanning processing module 512 and a printing processing module 514.

The scanning processing module 512 controls the image reading device 192 to read an image of a document.

The printing processing module 514 controls the printer 189 to print the image of the document. In the illustrated example, an answer sheet is printed.

The two-dimensional-barcode-containing answer sheet generation processing module 520 includes a two-dimensional barcode encoding processing module 522, a question/two-dimensional barcode combining processing module 524, and a two-dimensional-barcode-containing answer sheet printing processing module 526.

The two-dimensional barcode encoding processing module 522 generates a two-dimensional barcode at least including the first information and the second information described above. When the document is an answer sheet, the first information includes correct answer information, an explanation, and so on. The second information includes information indicating an area where the explanation is to be provided, that is, information indicating the position and size of the area. When the document is a questionnaire, the first information includes a URL or the like of a storage location of the tabulation result. The second information includes information indicating an area where the tabulation result is to be combined, that is, information indicating the position and size of the area. The second information may include the positions of answer columns, the allocation of points to each question, and so on. The first information and the second information will be described in detail below with reference to examples illustrated in FIG. 10 and FIG. 11.

The question/two-dimensional barcode combining processing module 524 affixes a two-dimensional barcode to the image of the document. For example, the two-dimensional barcode may be affixed to a space adjoining the answer column 370. Alternatively, the two-dimensional barcode may be affixed in accordance with the position in the second information. When the two-dimensional barcode is affixed in accordance with the position in the second information, the two-dimensional barcode is overwritten with the explanation. As a result, the two-dimensional barcode is removed.

The two-dimensional-barcode-containing answer sheet printing processing module 526 causes the printer 189 to print the answer sheet 350 via the printing processing module 514.

Figure 6:
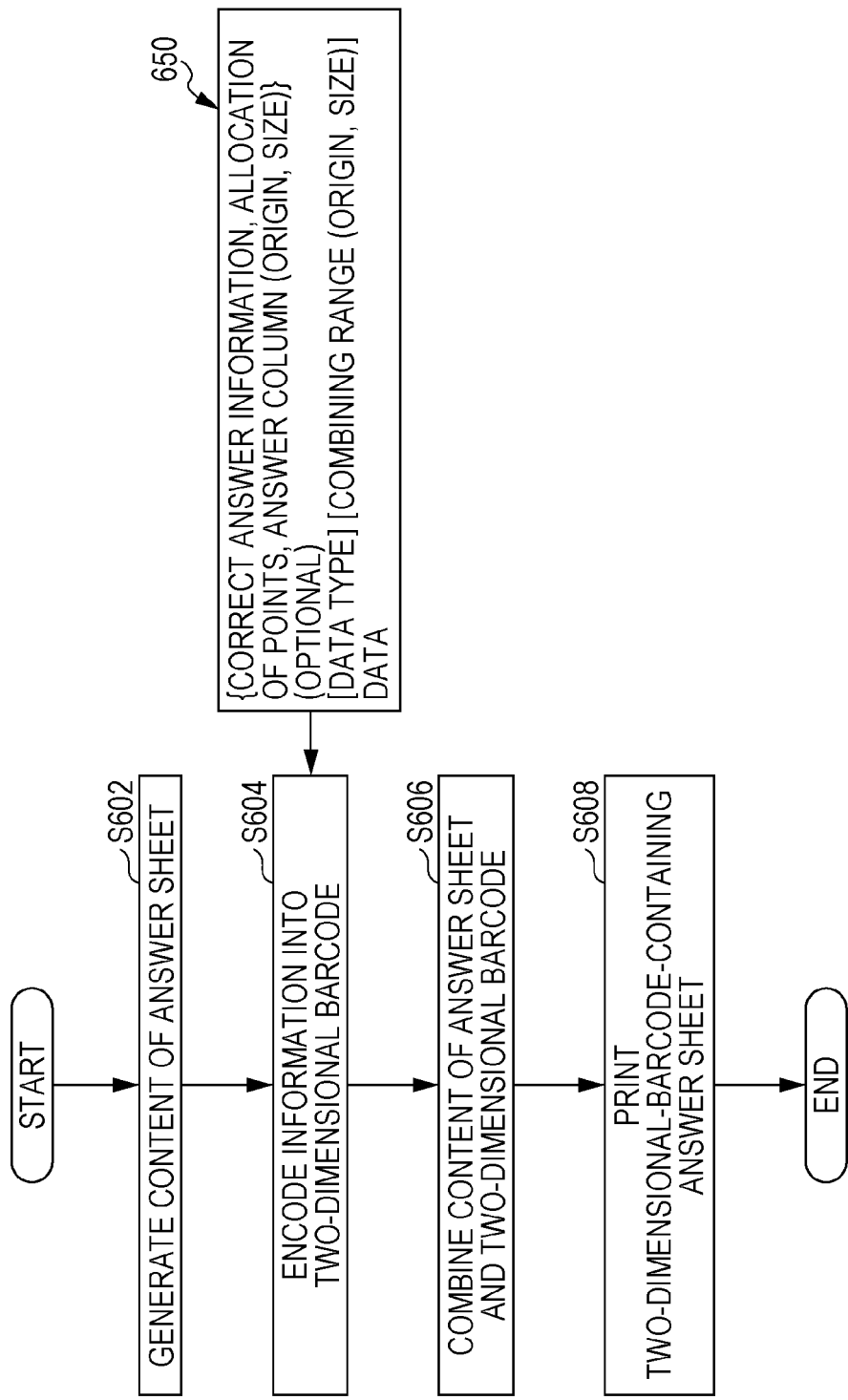
FIG. 6 is a flowchart illustrating an example process according to the exemplary embodiment.

FIG. 6 is a flowchart illustrating an example process according to this exemplary embodiment. The illustrated process relates to a document generation process performed by the document generation module 155 when the document is an answer sheet.

In step S602, the document generation module 155 generates the content of an answer sheet in accordance with an operation by a user. For example, the document generation module 155 determines the content of the question column 360 in the answer sheet 350 and the positions of the question column 360, the answer column 370, and the explanation column 380. Then, the document generation module 155 accepts information about a correct answer, such as the correct answer, points for the correct answer, and an explanation of the correct answer. It is to be understood that the information about a correct answer, such as the correct answer, points for the correct answer, and an explanation of the correct answer, is not actually printed on the answer sheet 350, but is encoded into a two-dimensional barcode.

In step S604, the document generation module 155 encodes information into a two-dimensional barcode. Specifically, the document generation module 155 performs a process of embedding the information described above, such as the position of the explanation column 380, the correct answer, points for the correct answer, and the explanation of the correct answer, into a two-dimensional barcode. Specifically, two-dimensional barcode information 650 to be embedded into a two-dimensional barcode includes "{correct answer information, allocation of points, answer column (origin, size)} (optional), [data type] [combining range (origin, size)], data". The details will be described below with reference to the examples illustrated in FIG. 10 and FIG. 11.

In step S606, the document generation module 155 combines the content of the answer sheet and the two-dimensional barcode. That is, the document generation module 155 generates an image to be printed.

In step S608, the document generation module 155 performs a process of printing a two-dimensional-barcode-containing answer sheet. Specifically, the document generation module 155 prints the image generated in step S606 on a sheet of paper. That is, the answer sheet 350 is generated. The question is printed as text readable by the user, and information about the correct answer is embedded in the two-dimensional barcode. This enables the image processing apparatus 200 alone to calculate a score and provide an explanation of the correct answer.

Figure 7:
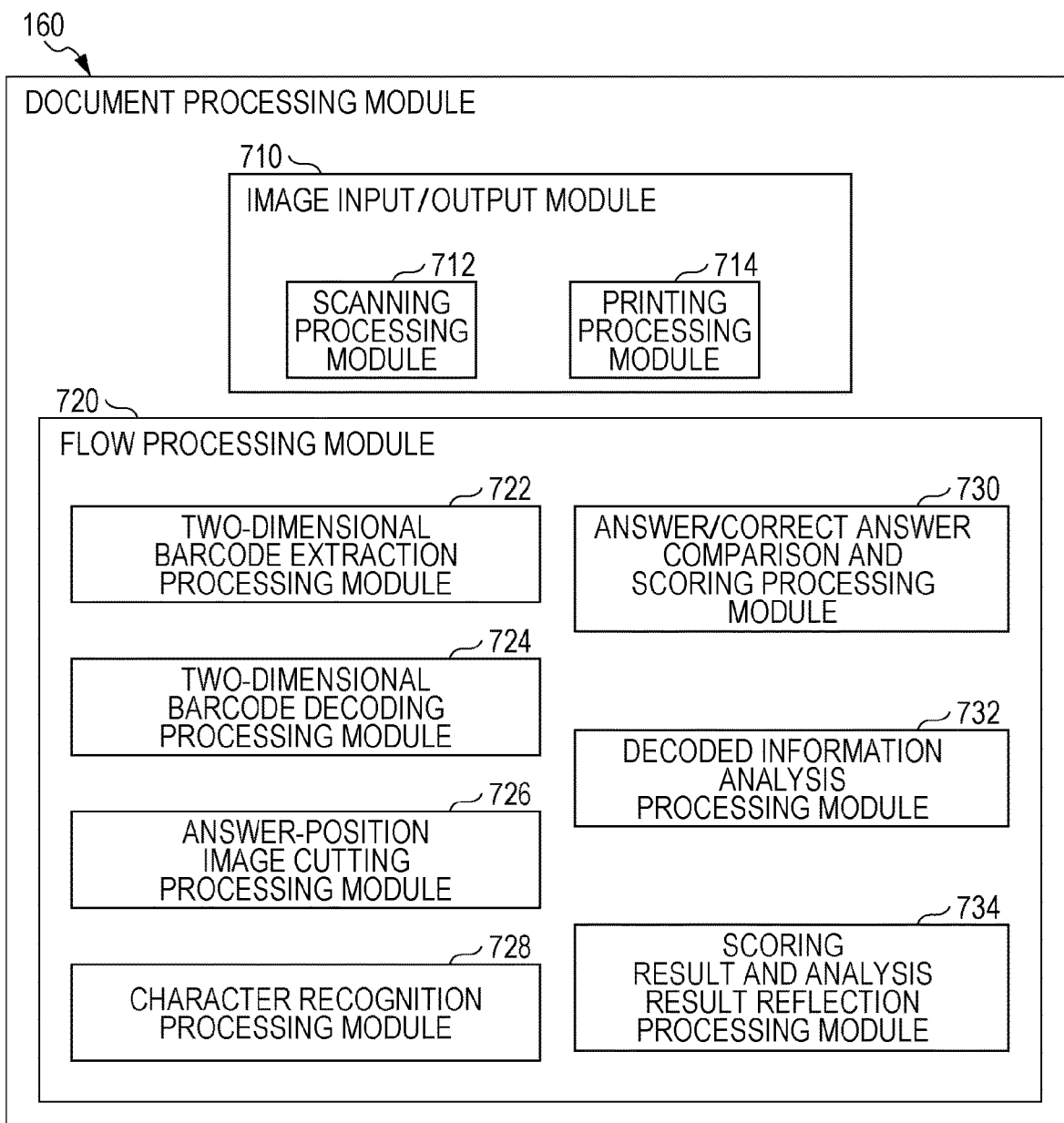
FIG. 7 is a specific module configuration diagram of a document processing module according to the exemplary embodiment.

FIG. 7 is a specific module configuration diagram of the document processing module 160 according to this exemplary embodiment.

The document processing module 160 includes an image input/output module 710 and a flow processing module 720.

The image input/output module 710 includes a scanning processing module 712 and a printing processing module 714.

The scanning processing module 712 controls the image reading device 192 to read an image of a document. The image of the document read by the scanning processing module 712 is hereinafter referred to also as a scan document. In the illustrated example, the scanning processing module 712 reads an answer sheet that has been filled in by a user.

The printing processing module 714 controls the printer 189 to print the image of the document. In the illustrated example, the printing processing module 714 scores the answer sheet read by the scanning processing module 712 and prints a document with which an explanation of each correct answer has been combined.

The flow processing module 720 includes a two-dimensional barcode extraction processing module 722, a two-dimensional barcode decoding processing module 724, an answer-position image cutting processing module 726, a character recognition processing module 728, an answer/correct answer comparison and scoring processing module 730, a decoded information analysis processing module 732, and a scoring result and analysis result reflection processing module 734.

The two-dimensional barcode extraction processing module 722 extracts a two-dimensional barcode from the scan document read by the scanning processing module 712. The two-dimensional barcode may be extracted by using an existing technique. For example, a two-dimensional barcode at a predetermined position in the document may be extracted, or the scan document may be searched for a predetermined pattern in the two-dimensional barcode by using pattern matching. Alternatively, features may be extracted from the scan document, and then a portion having a feature of the two-dimensional barcode may be extracted.

The two-dimensional barcode decoding processing module 724 decodes information contained in the extracted two-dimensional barcode. The decoded information includes at least first information and second information. The decoded information also includes the position of an answer column.

The answer-position image cutting processing module 726 cuts out a text image in the answer column in accordance with the position of the answer column in the decoded information.

The character recognition processing module 728 performs a character recognition process on the text image in the answer column.

The answer/correct answer comparison and scoring processing module 730 compares the answer obtained as a result of character recognition with the correct answer in the decoded information, and determines that the answer is correct when both match or otherwise determines that the answer is incorrect. Then, the answer/correct answer comparison and scoring processing module 730 refers to points for the question and calculates a score.

The decoded information analysis processing module 732 generates an explanation of the correct answer by using the decoded information. The generation process differs depending on the data type of the explanation of the correct answer. The details of the process will be described below with reference to an example illustrated in FIG. 9.

The scoring result and analysis result reflection processing module 734 combines the result of the scoring process and the explanation of the correct answer into the scan document. That is, the scoring result and analysis result reflection processing module 734 combines information as to whether each answer is correct, points for each answer, and an explanation of each correct answer into the scan document and prints the resulting document by using the printing processing module 714.

Figure 8:
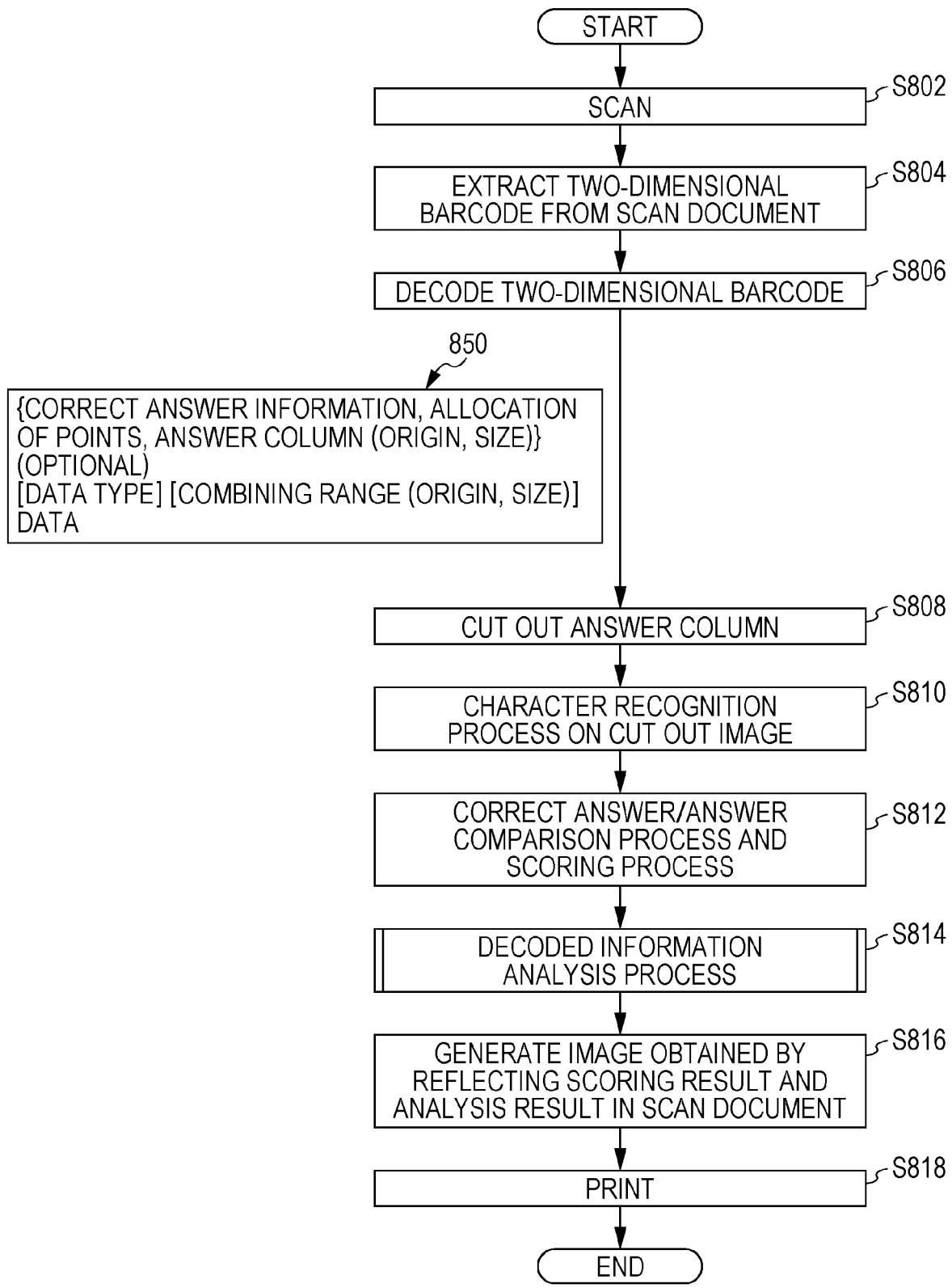
FIG. 8 is a flowchart illustrating an example process according to the exemplary embodiment.

FIG. 8 is a flowchart illustrating an example process according to this exemplary embodiment. The illustrated process relates to a scoring process performed by the document processing module 160 when the document is an answer sheet.

In step S802, the document processing module 160 performs scanning. Specifically, the document processing module 160 reads an answer sheet that has been filled in by a user and generates a scan document. In other words, the document processing module 160 scans an answer sheet with answers entered by an examinee.

In step S804, the document processing module 160 extracts a two-dimensional barcode from the scan document. If the scan document contains a plurality of two-dimensional barcodes, the processing of steps S806 to S814 is repeatedly performed a number of times equal to the number of two-dimensional barcodes.

In step S806, the document processing module 160 decodes the two-dimensional barcode. Specifically, two-dimensional barcode information 850, which is decoded information, includes "{correct answer information, allocation of points, answer column (origin, size)} (optional), [data type] [combining range (origin, size)], data". The details of the data will be described below with reference to the examples illustrated in FIG. 10 and FIG. 11.

In step S808, the document processing module 160 cuts out an answer column by using the decoded information. If the decoded information contains "answer column", an image of an area indicated by the position information of the "answer column" is cut out. Specifically, information indicating "answer column (origin, size)" is used. If the decoded information contains no "answer column", the process proceeds to step S814.

In step S810, the document processing module 160 performs a character recognition process of the cut out image. Specifically, the document processing module 160 recognizes handwritten characters.

In step S812, the document processing module 160 performs a correct answer/answer comparison process and a scoring process. The correct answer is contained in the decoded information of the two-dimensional barcode, and the answer is obtained as a result of character recognition in step S810. If the correct answer and the answer match, the document processing module 160 determines that the answer is correct, and adds the allocated points contained in the two-dimensional barcode to the total score.

In step S814, the document processing module 160 performs a process of analyzing the decoded information. The processing of step S814 will be described in detail below with reference to a flowchart illustrated in the example in FIG. 9.

In step S816, the document processing module 160 generates an image obtained by reflecting the scoring result and the analysis result in the scan document. For example, the document processing module 160 marks a correct answer with a circle in the answer column or marks an incorrect answer with a cross in the answer column, and enters a total score at a designated position (specifically, at an upper right position).

Then, the document processing module 160 performs the following processing operations to ensure a space for the explanation of the correct answer.

If the two-dimensional barcode has embedded therein margin information (top, bottom, left, and right margin widths), the document processing module 160 obtains the margin information.

If the two-dimensional barcode contains no margin information, the document processing module 160 analyzes a display area within the scan document and calculates the top, bottom, left, and right margin widths. For example, the document processing module 160 shifts the entire image to be printed in the upper left direction by an amount corresponding to top and left margin widths to increase the right and bottom margin widths to ensure a margin area (an area for providing the explanation of the correct answer).

If it is difficult to ensure a sufficient margin area (area for providing the explanation of the correct answer) in the process described above, the document processing module 160 reduces the size of a scanned image (an image of an answer sheet with answers entered) in accordance with the size of the combining range contained in the two-dimensional barcode information 850 to ensure, for example, spaces along the right and bottom edges, and combines the explanation of the correct answer into the spaces.

In step S818, the document processing module 160 prints the generated image. That is, the user is able to obtain a document containing the scoring result and the explanation of the correct answer.

In the system configuration illustrated in the example in FIG. 2B, each of the image processing apparatuses 200 may transmit a scoring result and so on to the score management device 250. For example, each of the image processing apparatuses 200 transmits a question number, an answer (an image and text obtained as a result of character recognition processing), a correct answer, a total score, and so on to the score management device 250. The score management device 250 is capable of determining the learning level of each user (examinee). For example, an answer determined to be incorrect can be checked.

Figure 9:
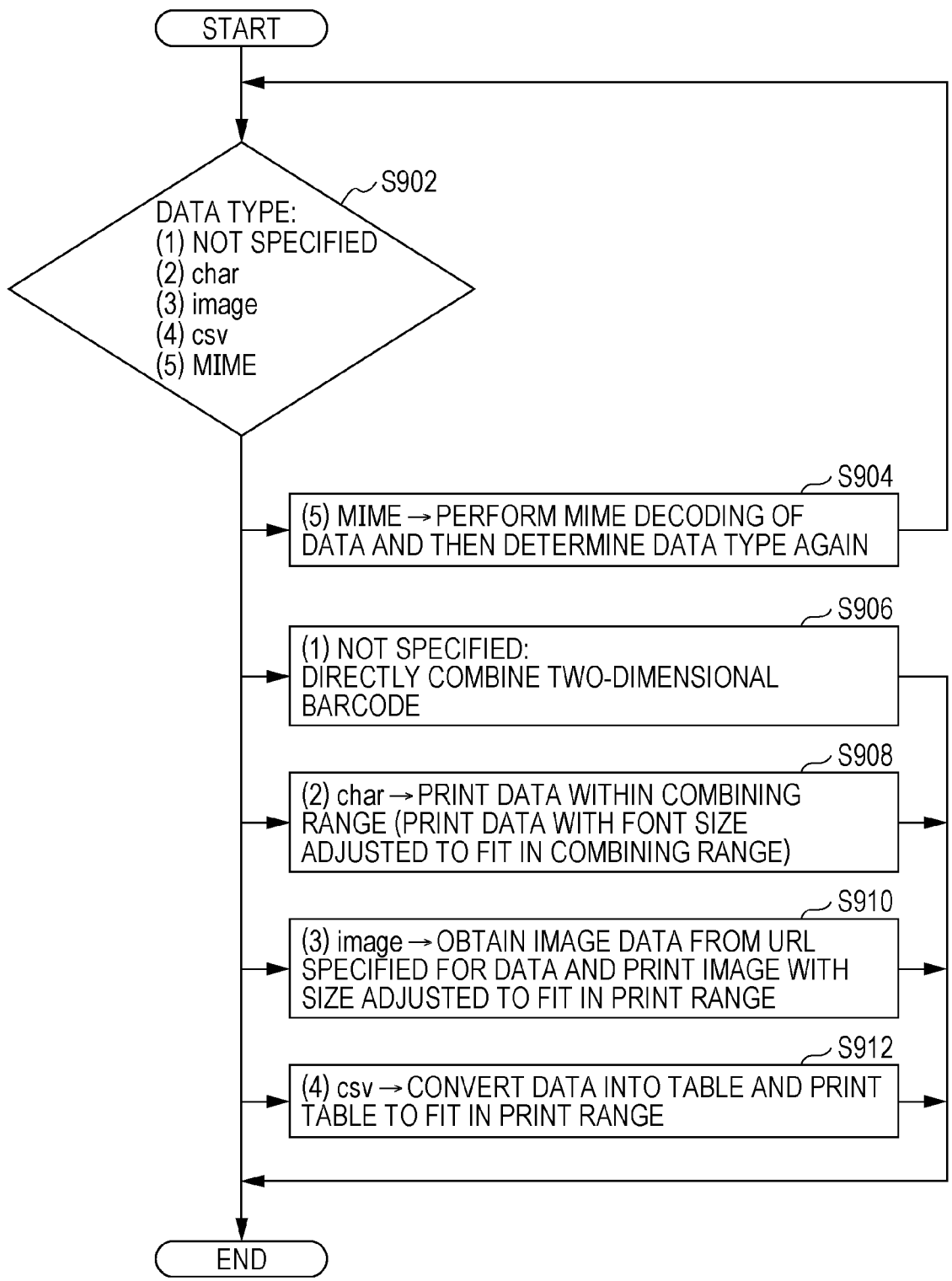
FIG. 9 is a flowchart illustrating an example process according to the exemplary embodiment.

FIG. 9 is a flowchart illustrating an example process according to this exemplary embodiment. The illustrated process relates to a data type determination process for combining an explanation of a correct answer, and the details of the processing of step S814 in the flowchart illustrated in FIG. 8 are illustrated.

In step S902, the document processing module 160 determines the data type in the decoded two-dimensional barcode. The process proceeds to step S906 for (1) the data type "not specified", to step S908 for (2) the data type "char" (characters or text type), to step S910 for (3) the data type "image" (image type), to step S912 for (4) the data type "csv" (table type), and step S904 for (5) the data type "MIME (Multipurpose Internet Mail Extension)" (obfuscation type).

In step S904, the document processing module 160 performs MIME decoding of data and then determines the data type again. MIME is used for the following reasons. For example, an application is available that is capable of reading a two-dimensional barcode by using a smartphone and decoding the content of the two-dimensional barcode. This application allows anyone to know information embedded in the two-dimensional barcode, such as correct answers. To prevent anyone from easily identifying the content of the two-dimensional barcode even if they are successful in decoding the two-dimensional barcode, an obfuscation processing may be performed. One example of the obfuscation processing may be to use MIME. The data is decoded as a MIME string, and the decoding result is subjected to a data type determination process again. In addition to MIME, the data may be encrypted. That is, in step S904, the encrypted data is decrypted, and the result of decryption is subjected to a data type determination process again.

In step S906, the document processing module 160 directly combines the two-dimensional barcode. The data type "not specified" is used not for a two-dimensional barcode having encoded therein the correct answer and so on but for a two-dimensional barcode used for any other purpose. For the data type "not specified", the original two-dimensional barcode is printed directly.

In step S908, the document processing module 160 combines data indicating the explanation of the correct answer into a combining range. In this case, if the data is text data, the document processing module 160 combines the data with the font size adjusted to fit in the combining range. The combining range corresponds to the combining range contained in the two-dimensional barcode information 850.

In step S910, the document processing module 160 obtains image data from the URL specified for the data and prints an image with the size adjusted to fit in the print range. The image data may be too large in capacity to be encoded into a two-dimensional barcode. To address this inconvenience, a URL that stores the image data is encoded into a two-dimensional barcode, and in a scoring operation, the image data is obtained from the URL and is combined as the explanation of the correct answer.

In step S912, the document processing module 160 converts the data into a table and prints the table to fit in the print range. This operation is used, for example, when the explanation of the correct answer is provided in comma-separated values (CSV) format.

FIG. 10 illustrates an example of a data structure 1000 of a two-dimensional barcode.

The item "correct answer information" 1010 is optional and contains the "correct answer to each question".

The item "allocation of points" 1020 is optional and contains the "points per correct answer". For example, "20" points are given.

The item "answer column" 1030 is optional and contains the "origin (x coordinate, y coordinate) and size (horizontal dimension, vertical dimension) of each answer column (rectangular)". An example is "(20, 50, 200, 40)". Specifically, a rectangular area with the origin (x coordinate, y coordinate) at the upper left corner thereof and having a width and height corresponding to the horizontal dimension and the vertical dimension, respectively, which start from the origin, is designated as an answer column.

The item "data type" 1040 is required and contains "specify the type of data. If no data type is specified, the two-dimensional barcode is printed directly". An example is "specify any of the following data types: [char], [image], [csv], and [MIME]".

The item "combining range" 1050 is optional and contains the "origin (x coordinate, y coordinate) and size (horizontal dimension, vertical dimension) of the combining range (rectangular) in which the data type and the analysis result of the data are reflected. If no combining range is specified, a frame around the two-dimensional barcode is recognized and the space in the recognized frame is identified as the combining range". An example is "(100, 250, 400, 200)".

The item "data" 1060 is required and contains "specify the format according to the specified data type". For example, the format is specified in accordance with a data type/data relationship 1100.

FIG. 11 illustrates an example of the data type/data relationship 1100.

The data handling for the data type "not specified" 1110 is "directly combine the image of the two-dimensional barcode".

The data handling for the data type [char] 1120 is: "Specify text. Combine the text with the font size adjusted to fit in the combining range". An example is "[char] George Washington".

The data handling for the data type [image] 1130 is: "Specify a URL for data. Obtain an image file from the URL specified for the data, and combine the image with the image size adjusted to fit in the combining range. The same data handling as for "not specified" is applied to environments where the Internet is inaccessible". An example is "[image] http://www.xxx.xx/images/georgewashington.jpg".

The data handling for the data type [csv] 1140 is: "Enter data in csv format. Convert the data into a table, and combine the table with the font size adjusted to fit in the combining range". An example is "[csv] rank, country, production quantity (in t) 1, US, 37100000, 2, EU, 23400000, 3, China, 22500000".

The data handling for the data type [MIME] 1150 is: "Set data as a MIME-encoded character string". An example is "[MIME]=?ISO-2022-JP?B?W2NoYXJdGyRCQDtGQUJAO1IbKEI=?=".

Data types may be added to address an increase in usage for various purposes in the future. The processing operations in the flowchart illustrated in the example in FIG. 9 are also corrected accordingly.

FIGS. 12A and 12B illustrate examples of how processing is carried out according to this exemplary embodiment. An example process is illustrated for shifting a printed portion in a scan document to narrow a space in the scan document to ensure a combining area.

In the example illustrated in FIG. 12A, a draft of an examination answer sheet is illustrated. An answer sheet 1200 has (1) a question column 1210 that is an area providing a question, (2) an answer column 1220 that is an area to be filled in with an answer to the question, and (3) an explanation column 1230 that is an area where an explanation of the correct answer is to be provided.

In the example illustrated in FIG. 12B, a document generated in accordance with the answer sheet 1200 illustrated in the example in FIG. 12A is illustrated. That is, an answer sheet 1250 is a document obtained by printing a document generated by the document generation module 155 by using the printer 189. The answer sheet 1250 has a question column 1260, an answer column 1270, and a two-dimensional barcode 1290. It is to be understood that the question column 1260 corresponds to the question column 1210 and the answer column 1270 corresponds to the answer column 1220. The two-dimensional barcode 1290 is provided next to the answer column 1270. The process of generating the answer sheet 1250 has been described with reference to the flowchart illustrated in the example in FIG. 6.

Figure 13B:
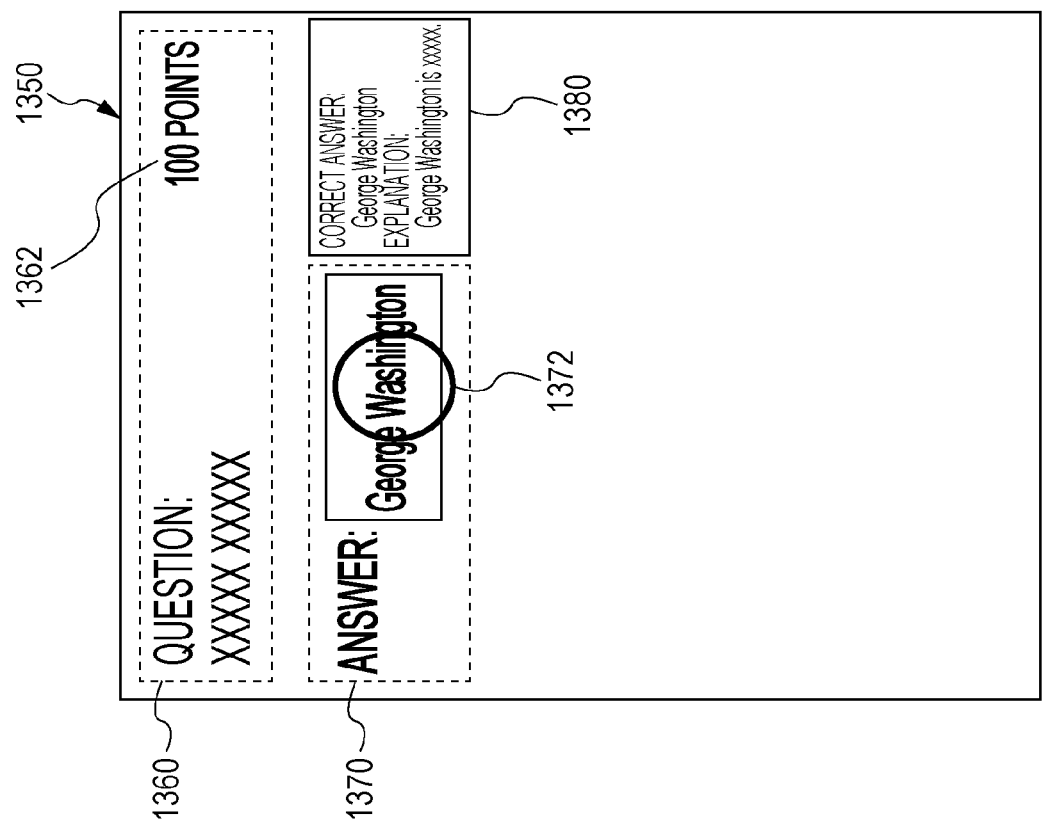
FIGS. 13A and 13B illustrate examples of how processing is carried out according to the exemplary embodiment.
Figure 13A:
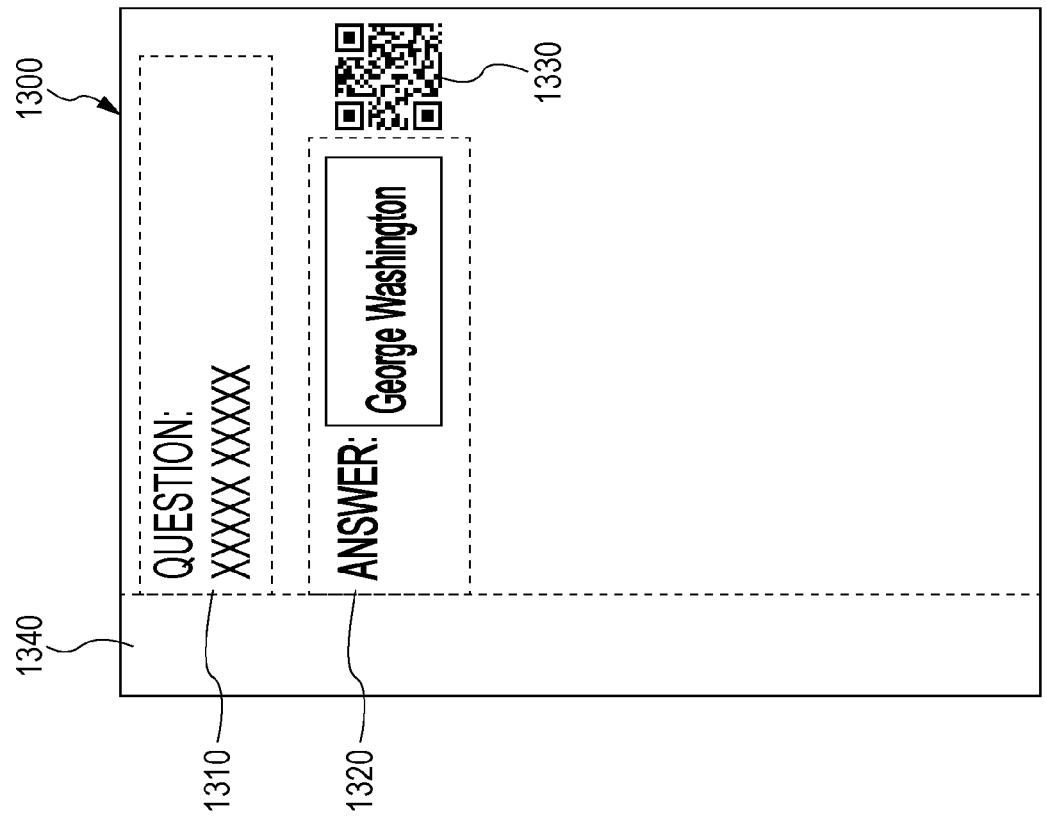

FIGS. 13A and 13B illustrate examples of how processing is carried out according to this exemplary embodiment.

In the example illustrated in FIG. 13A, a document including an answer entered by a user is illustrated. That is, an answer sheet 1300 is a document obtained by filling in the answer sheet 1250 with an answer. The answer sheet 1300 has a question column 1310, an answer column 1320, and a two-dimensional barcode 1330. It is to be understood that the question column 1310 corresponds to the question column 1260, the answer column 1320 corresponds to the answer column 1270, and the two-dimensional barcode 1330 corresponds to the two-dimensional barcode 1290. The answer column 1320 is filled in with an answer by the user. In the illustrated example, "George Washington" is entered in the answer column 1320.

In the example illustrated in FIG. 13B, a document containing a scoring result for the answer sheet 1300 and also containing an explanation of the correct answer is illustrated. That is, an answer sheet 1350 is a document obtained by reading the answer sheet 1300 by using the image reading device 192 and printing processing results obtained by the document processing module 160 by using the printer 189. The answer sheet 1350 has a question column 1360, an answer column 1370, and an explanation column 1380. It is to be understood that the question column 1360 corresponds to the question column 1310 and the answer column 1370 corresponds to the answer column 1320. The question column 1360 contains a score 1362 indicating "100 points" (perfect score). A scoring result 1372 is given in the answer column 1370. That is, the handwritten character string "George Washington" in the answer column 1370 is subjected to character recognition, and the character recognition result and the correct answer embedded in the two-dimensional barcode 1330, namely, "George Washington", are compared to determine that the handwritten answer is correct. Accordingly, the scoring result 1372 indicating that the entered answer is correct is provided in the answer column 1370. The explanation column 1380 provides a description, for example, "Correct Answer: George Washington" and "Explanation: George Washington is xxxxx".

The space located to the right of the answer column 1320 in the answer sheet 1300 is too small to combine the explanation column 1380 into. That is, the combining range contained in the two-dimensional barcode 1330 is set on the right side of the answer column 1320 and overlaps the printed portion in the answer column 1320. The answer sheet 1300 has a space 1340 on the left side thereof. In this exemplary embodiment, the question column 1310 and the answer column 1320 are shifted to the left to ensure a space into which the explanation column 1380 is to be combined. That is, in the answer sheet 1350, the question column 1360 and the answer column 1370 are shifted to the left by an amount corresponding to the space to fill out the space 1340 on the left side (an example of "narrowing a space"). As a result, a space is created along the right edge. The explanation column 1380 is combined into the created space. That is, an area is ensured for the explanation column 1380 so that the area for the explanation column 1380 does not overlap the printed portion in the answer column 1370.

In the illustrated example, in the determination of whether the explanation column 1380 overlaps a printed portion, the printed portion does not include the two-dimensional barcode 1330. That is, whether the two-dimensional barcode 1330 overlaps a combining range is not basically determined. This is because the two-dimensional barcode 1330 may be removed when the answer sheet 1350 is printed. However, if the data type of the two-dimensional barcode 1330 is "not specified", the two-dimensional barcode 1330 is also included in the printed portion to be used for determination (i.e., whether the two-dimensional barcode 1330 overlaps the combining range is also determined), and the combining area is ensured so as not to also overlap the two-dimensional barcode 1330.

Figure 14B:
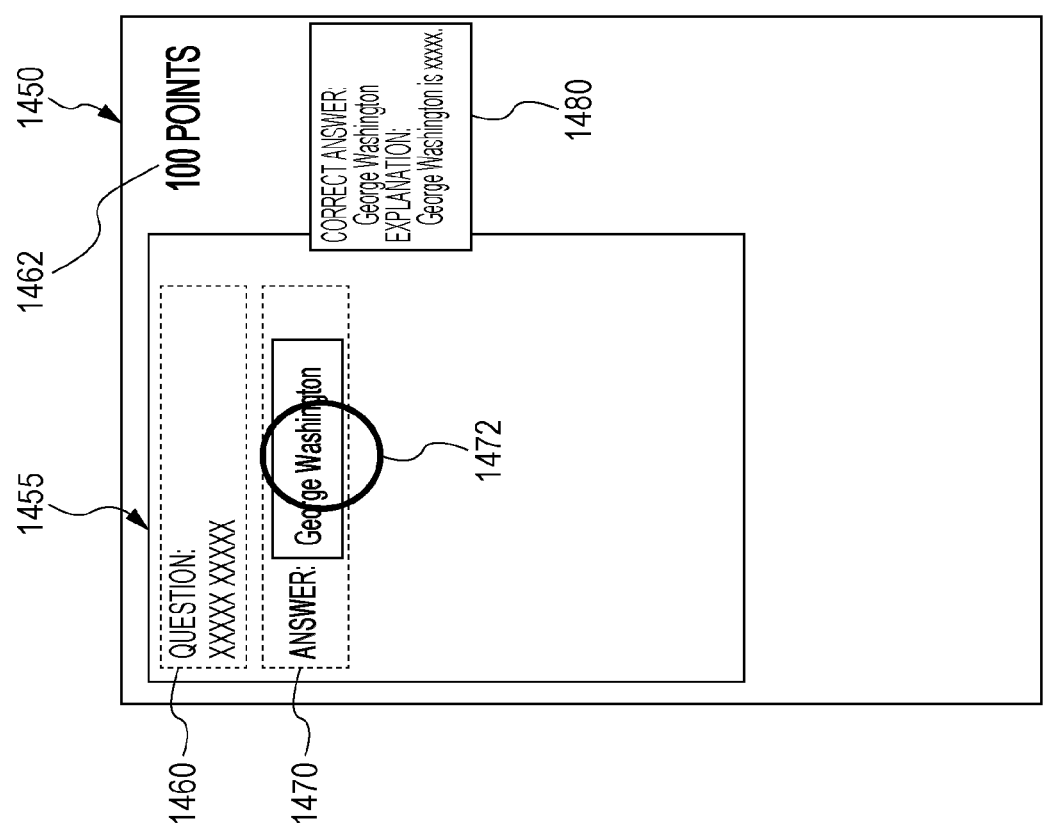
FIGS. 14A and 14B illustrate examples of how processing is carried out according to the exemplary embodiment.
Figure 14A:
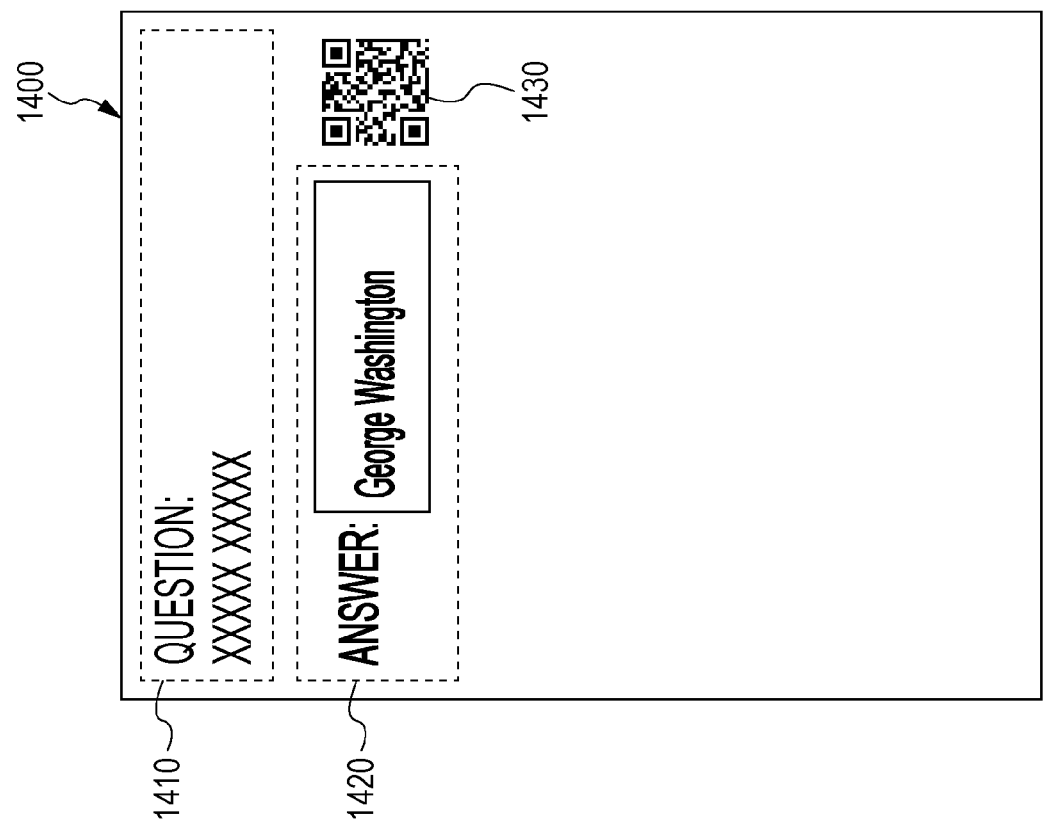

FIGS. 14A and 14B illustrate examples of how processing is carried out according to this exemplary embodiment. An example process is illustrated for reducing the size of a printed portion to ensure a combining area if the combining range overlaps the printed portion even after the printed portion has been shifted.

In the example illustrated in FIG. 14A, a document including an answer entered by a user is illustrated. That is, an answer sheet 1400 is a document filled in with an answer, like the answer sheet 1300 illustrated in the example in FIG. 13A. It is to be noted that the space 1340 is not given on the left side, unlike the answer sheet 1300. That is, an example is illustrated in which it is difficult to ensure the space for a combining area even if the printed portion is shifted.

In the example illustrated in FIG. 14B, a document containing a scoring result for the answer sheet 1400 and also containing an explanation of the correct answer is illustrated. That is, an answer sheet 1450 is a document into which the explanation and so on have been combined, like the answer sheet 1350 illustrated in the example in FIG. 13B. It is to be noted that the entire answer sheet 1400 is reduced in size to form a size-reduced image 1455 to create a space on the right side of the answer sheet 1450. An explanation column 1480 is combined into the space. The reduction ratio may be determined so that a space for the explanation column 1480 can be created without making the explanation column 1480 overlap printed portions of a question column 1460 and an answer column 1470. Also in the illustrated example, the answer sheet 1450 is generated such that a two-dimensional barcode 1430 in the original answer sheet 1400 is removed.

FIGS. 15A and 15B illustrate examples of how processing is carried out according to this exemplary embodiment. In the illustrated examples, the target document is a questionnaire.

In the example illustrated in FIG. 15A, a draft of a questionnaire is illustrated. A questionnaire (for design) 1500 has (1) a questionnaire question column 1510 that is an area providing a questionnaire question, (2) a questionnaire response column 1520 that is an area to be filled in with a response to the questionnaire question, and (3) a questionnaire result display column 1530 that is an area where the tabulation result is to be provided.

In the example illustrated in FIG. 15B, a document generated in accordance with the questionnaire (for design) 1500 illustrated in the example in FIG. 15A is illustrated. That is, a questionnaire 1550 is a document obtained by printing a document generated by the document generation module 155 by using the printer 189. The questionnaire 1550 has a questionnaire question column 1560, a questionnaire response column 1570, and a two-dimensional barcode 1580. It is to be understood that the questionnaire question column 1560 corresponds to the questionnaire question column 1510 and the questionnaire response column 1570 corresponds to the questionnaire response column 1520. The two-dimensional barcode 1580 is provided. The process of generating the questionnaire 1550 will be described below with reference to a flowchart illustrated in an example in FIG. 17.

FIGS. 16A and 16B illustrate examples of how processing is carried out according to this exemplary embodiment.

In the example illustrated in FIG. 16A, a document including a response entered by a user to the questionnaire question is illustrated. That is, a questionnaire 1600 is a document obtained by filling in the questionnaire 1550 with a response. The questionnaire 1600 has a questionnaire question column 1610, a questionnaire response column 1620, and a two-dimensional barcode 1630. It is to be understood that the questionnaire question column 1610 corresponds to the questionnaire question column 1560, the questionnaire response column 1620 corresponds to the questionnaire response column 1570, and the two-dimensional barcode 1630 corresponds to the two-dimensional barcode 1580. The questionnaire response column 1620 contains a response entered by the user. In the illustrated example, "B" is surrounded with a circle, which indicates the selection of the option "B".

In the example illustrated in FIG. 16B, a document containing a tabulation result of responses to the questionnaire 1600 is illustrated. That is, a questionnaire result graph 1690 has been combined into a questionnaire 1650.

The questionnaire 1600 has no space into which the questionnaire result graph 1690 is to be combined so as not to interfere with a printed portion corresponding to the questionnaire question column 1610 or the questionnaire response column 1620. That is, combining the questionnaire result graph 1690 into a combining range embedded in the two-dimensional barcode 1630 causes the questionnaire result graph 1690 to overlap the printed portion corresponding to the questionnaire response column 1620. To address this inconvenience, the entire questionnaire 1600 is reduced in size to form a size-reduced image 1660 to create a space on the right side of the questionnaire 1650. The questionnaire result graph 1690 is combined into the space. The reduction ratio may be determined so that a space for the questionnaire result graph 1690 can be created without making the questionnaire result graph 1690 overlap printed portions of a questionnaire question column 1670 and a questionnaire response column 1680. Also in the illustrated example, the questionnaire 1650 is generated such that the two-dimensional barcode 1630 in the original questionnaire 1600 is removed. The image data of the questionnaire result graph 1690 is obtained from a URL embedded in the two-dimensional barcode 1630 and represents the latest tabulation result. The process of generating the questionnaire 1650 will be described below with reference to a flowchart illustrated in an example in FIG. 18.

Figure 17:
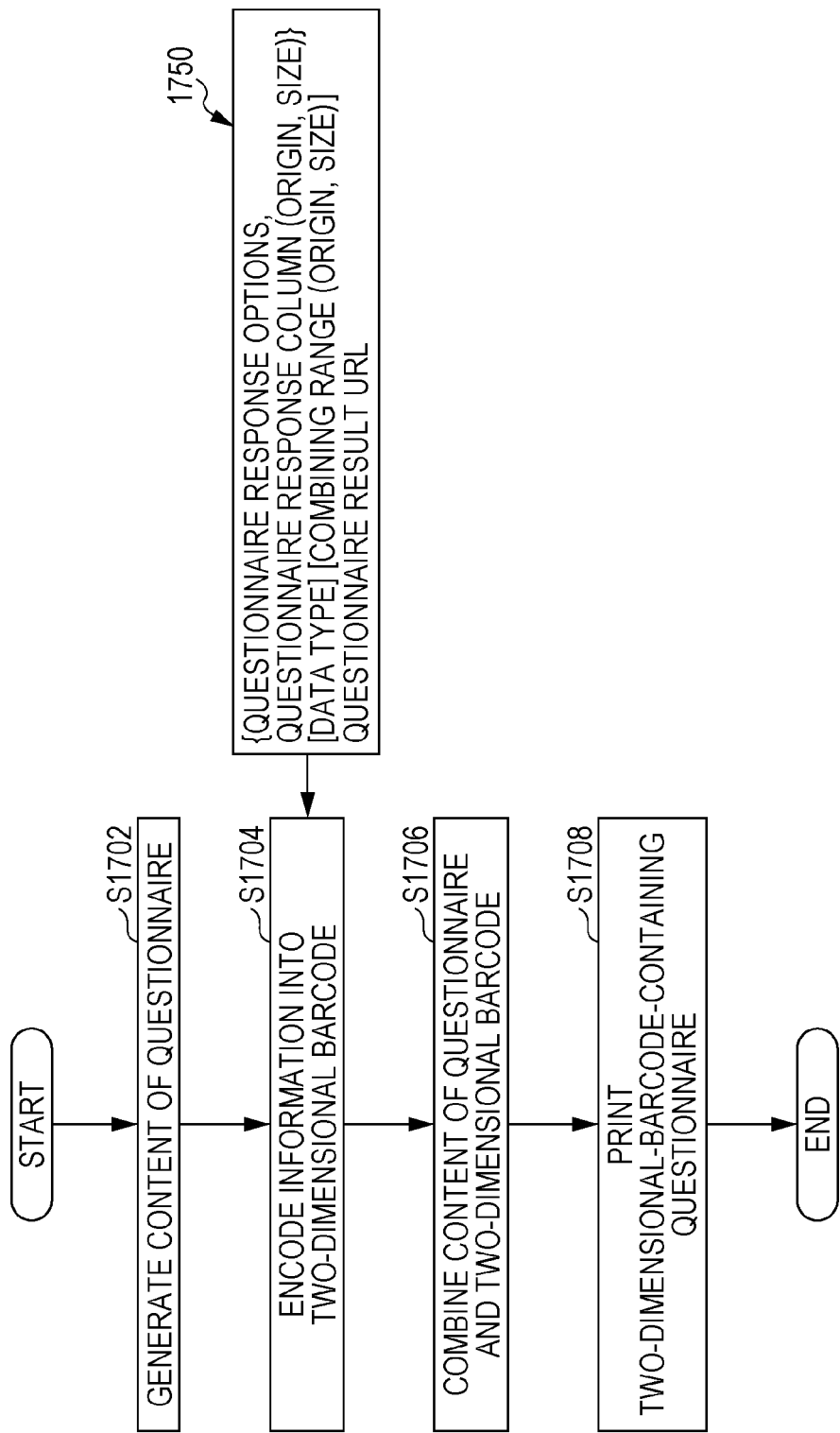
FIG. 17 is a flowchart illustrating an example process according to the exemplary embodiment.

FIG. 17 is a flowchart illustrating an example process according to this exemplary embodiment. The illustrated process relates to a document generation process performed by the document generation module 155 when the document is a questionnaire.

In step S1702, the document generation module 155 generates the content of a questionnaire in accordance with an operation by a user. For example, the document generation module 155 determines the content of the questionnaire question column 1560 and the questionnaire response column 1570 in the questionnaire 1550, and the positions of the questionnaire question column 1560, the questionnaire response column 1570, and the two-dimensional barcode 1580. Then, the document generation module 155 accepts a URL or the like of the tabulation device 260 that distributes the tabulation result. It is to be understood that the URL or the like is not actually printed on the questionnaire 1550, but is encoded into a two-dimensional barcode.

In step S1704, the document generation module 155 encodes information into a two-dimensional barcode. Specifically, the document generation module 155 performs a process of embedding the information described above, such as the position of the questionnaire result graph 1690 and the URL, into a two-dimensional barcode. Specifically, two-dimensional barcode information 1750 includes "{questionnaire response options, questionnaire response column (origin, size)}, [data type] [combining range (origin, size)], questionnaire result URL".

In step S1706, the document generation module 155 combines the content of the questionnaire and the two-dimensional barcode. That is, the document generation module 155 generates an image to be printed.

In step S1708, the document generation module 155 performs a process of printing a two-dimensional-barcode-containing questionnaire. Specifically, the document generation module 155 prints the image generated in step S1706 on a sheet of paper. That is, the questionnaire 1550 is generated. The questionnaire question and the like are printed as text readable by the user, and the questionnaire result URL and so on are embedded in the two-dimensional barcode. This enables the image processing apparatus 200 to distribute responses to the questionnaire to the tabulation device 260 and to provide the tabulation result.

Figure 18:
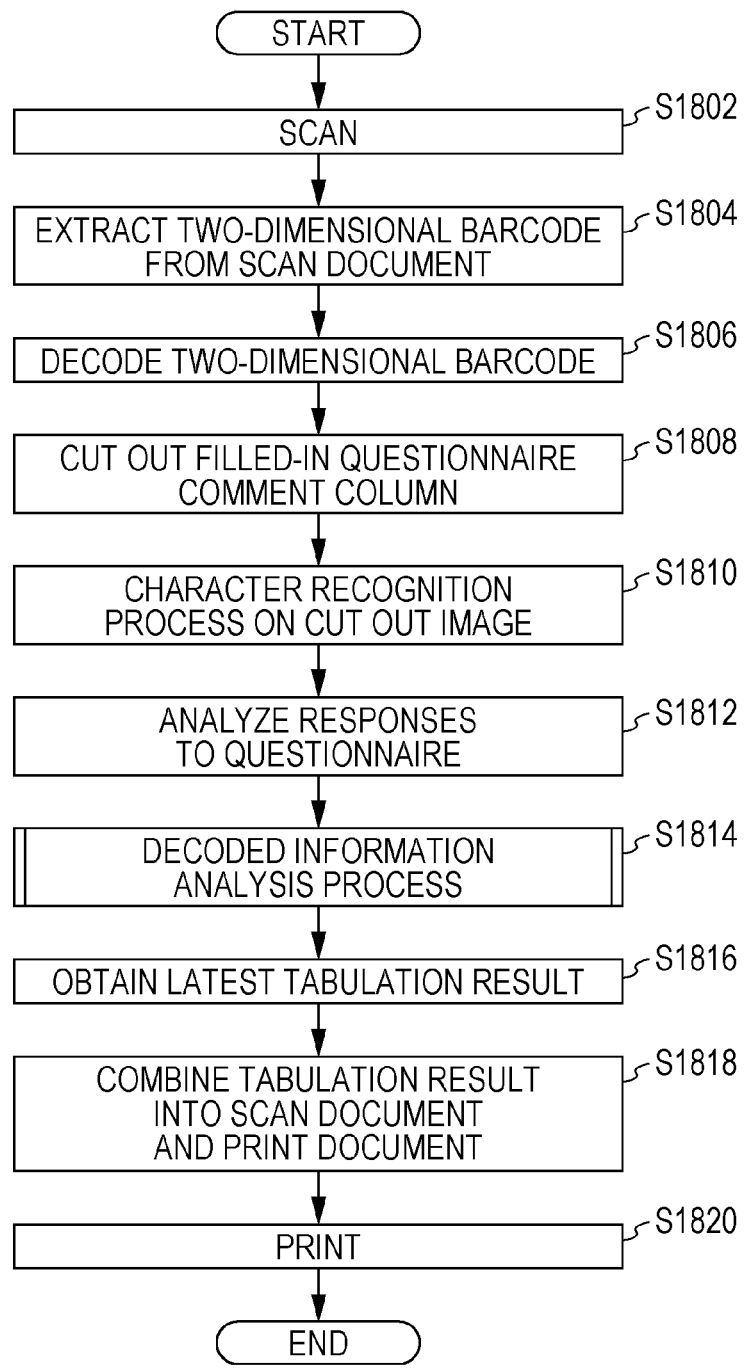
FIG. 18 is a flowchart illustrating an example process according to the exemplary embodiment.

FIG. 18 is a flowchart illustrating an example process according to this exemplary embodiment. The illustrated process relates to a questionnaire process performed by the document processing module 160 when the document is a questionnaire.

In step S1802, the document processing module 160 performs scanning. Specifically, the document processing module 160 reads a questionnaire filled in by a user and generates a scan document.

In step S1804, the document processing module 160 extracts a two-dimensional barcode from the scan document. If the scan document contains a plurality of two-dimensional barcodes, the processing of steps S1806 to S1814 is repeatedly performed a number of times equal to the number of two-dimensional barcodes.

In step S1806, the document processing module 160 decodes the two-dimensional barcode. Specifically, the information encoded in step S1704 in the flowchart illustrated in the example in FIG. 17 is decoded. That is, the two-dimensional barcode information 1750 includes "{questionnaire response options, questionnaire response column (origin, size)}, [data type] [combining range (origin, size)], questionnaire result URL".

In step S1808, the document processing module 160 cuts out a filled-in questionnaire column by using the decoded information. If the decoded information contains "questionnaire response column", an image of an area indicated by the position information of the "questionnaire response column" is cut out. Specifically, information indicating the "questionnaire response column (origin, size)" is used. If the decoded information contains no "questionnaire response column", the process proceeds to step S1814.

In step S1810, the document processing module 160 performs a character recognition process of the cut out image. Specifically, the document processing module 160 recognizes handwritten characters. For example, the document processing module 160 recognizes the position of an item marked with a sign (such as an item surrounded with a circle), a handwritten response or comment, or the like.

In step S1812, the document processing module 160 analyzes responses to the questionnaire. The document processing module 160 performs processing such as identifying a selected item number from the position of the marked item.

In step S1814, the document processing module 160 analyzes the decoded information. The detailed processing of step S1814 has been described with reference to the flowchart illustrated in the example in FIG. 9.

In step S1816, the document processing module 160 transmits the result of responding to the questionnaire to the tabulation device 260 and obtains the latest tabulation result from the tabulation device 260.

In step S1818, the document processing module 160 combines the tabulation result into the scan document and prints the resulting document.

In step S1820, the document processing module 160 performs printing. That is, the user is able to obtain a document containing his/her responses to the questionnaire and the tabulation result.

The image processing apparatus 200 may be capable of performing both a process of printing a score for an answer sheet and a process of collecting responses to a questionnaire. In this case, a user who is to print a score or collect responses to a questionnaire scans a sheet by setting the sheet in the image processing apparatus 200 and selecting either a "print score" button or a "collect questionnaire responses" button on a user interface screen of the image processing apparatus 200. After the user selects a button, the process corresponding to the selected button is started, the sheet is scanned, the scan document is delivered to the information processing apparatus 100, and a result of processing is printed by the image processing apparatus 200 in which the sheet is scanned.

The program described above may be stored in a recording medium, and the recording medium may be provided. Alternatively, the program may be provided via a communication means. In this case, for example, the program described above may be implemented as a "computer-readable recording medium storing the program".

The term "computer-readable recording medium storing the program" refers to a recording medium readable by a computer and having the program recorded thereon, which is used for installing and executing the program, distributing the program, or any other purpose.

Examples of the recording medium include digital versatile discs (DVDs), such as discs based on standards created by the DVD Forum, namely, DVD-R, DVD-RW, and DVD-RAM, and discs based on standards created by the DVD+RW Alliance, namely, DVD+R and DVD+RW, compact discs (CDs), such as a compact disc read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a ROM, an electrically erasable programmable read-only memory (EEPROM (registered trademark)), a flash memory, a RAM, and a secure digital (SD) memory card.

All or part of the program described above may be recorded on the recording medium described above for storage or distribution, for example. Alternatively, all or part of the program described above may be transmitted via communication by using a transmission medium such as a wired network, a wireless communication network, or a combination thereof that is used for a communication architecture such as a local area network (LAN), a metropolitan area network (MAN), a wide area network (WAN), the Internet, an intranet, or an extranet, or may be carried on carrier waves.

Additionally, the program described above may be part or all of another program, or may be recorded on a recording medium together with an individual program. Alternatively, the program may be divided into pieces which are recorded on a plurality of recording media. Moreover, the program may be recorded in any form that is restorable, such as in compressed or encrypted form.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
receive an image of a document,
extract first information and second information from information image printed on the document, the first information being related to writing on the document by a user, the second information indicating a position and a size of an area into which the first information is to be combined with the image of the document, wherein the information image is a machine-readable code, and
perform control to ensure the area indicated by the second information so that the area does not overlap a printed portion in the document and to combine the first information into the area,
wherein upon a determination that the area indicated by the second information overlaps the printed portion in the document, the processor adjusts the printed portion in the document to ensure the area indicated by the second information does not overlap the printed portion in the document.

2. The information processing apparatus according to claim 1, wherein
the processor is configured to, upon a determination that the area indicated by the second information overlaps the printed portion in the document, shift the printed portion in the document to ensure the area indicated by the second information does not overlap the printed portion in the document.

3. The information processing apparatus according to claim 2, wherein
the processor is configured to shift the printed portion in the document to narrow a space located along an edge of the document to ensure the area indicated by the second information does not overlap the printed portion in the document.

4. The information processing apparatus according to claim 1, wherein
the processor is configured to, upon a determination that the area indicated by the second information overlaps the printed portion, reduce a size of the printed portion in the document to ensure the area indicated by the second information does not overlap the printed portion in the document.

5. The information processing apparatus according to claim 4, wherein the reducing of the size of the printed portion is in response to a determination that the overlap between the printed portion and the area indicated by the second information cannot be avoided by shifting the printed portion.

6. The information processing apparatus according to claim 5, wherein the reducing of the size of the printed portion is in response to a determination that the printed portion cannot be shifted.

7. The information processing apparatus according to claim 1, wherein
the document is an answer sheet,
the first information is a correct answer or an explanation of the correct answer,
the second information indicates a position and a size of an area where the explanation is to be provided, and
the processor is configured to
perform character recognition on an answer written by an answerer the answer sheet and to score the recognized answer by using the correct answer, and combine the explanation into the image of the document in accordance with the second information.

8. The information processing apparatus according to claim 7, wherein
the processor is configured to combine the explanation into the image of the document in accordance with the second information in response to a determination that the answer written by the user is incorrect.

9. The information processing apparatus according to claim 1, wherein
the document is a copy of a questionnaire,
the first information indicates a storage location of a tabulation result of responses to the questionnaire,
the second information indicates a position and a size of an area where the tabulation result is to be provided, and
the processor is configured to
obtain the tabulation result from the storage location, and
combine the tabulation result into the image of the document in accordance with the second information.

10. A non-transitory computer readable medium storing a program causing a computer to execute a process for information processing, the process comprising:
receiving an image of a document;
extracting first information and second information from information image printed on the document, the first information being related to writing on the document by a user, the second information indicating a position and a size of an area into which the first information is to be combined with the image of the document, wherein the information image is a machine-readable code; and
performing control to ensure the area indicated by the second information so that the area does not overlap a printed portion in the document and to combine the first information into the area,
wherein upon a determination that the area indicated by the second information overlaps the printed portion in the document, the printed portion in the document is adjusted to ensure the area indicated by the second information does not overlap the printed portion in the document.

11. An information processing apparatus comprising:
means for receiving an image of a document;
means for extracting first information and second information from information image printed on the document, the first information being related to writing on the document by a user, the second information indicating a position and a size of an area into which the first information is to be combined with the image of the document, wherein the information image is a machine-readable code; and
means for performing control to ensure the area indicated by the second information so that the area does not overlap a printed portion in the document and to combine the first information into the area, wherein upon a determination that the area indicated by the second information overlaps the printed portion in the document, the printed portion in the document is adjusted to ensure the area indicated by the second information does not overlap the printed portion in the document.

* * * * *